US012748928B2

(12) United States Patent
Bradley et al.

(10) Patent No.: US 12,748,928 B2
(45) Date of Patent: Sep. 29, 2026

(54) SERVICE PLATFORM INTEGRATION WITH GENERATIVE NATURAL LANGUAGE MODELS

(71) Applicant: ServiceNow, Inc., Santa Clara, CA (US)

(72) Inventors: Douglas Steele Lorn Bradley, San Diego, CA (US); Rita Maria Castillo, San Diego, CA (US); Troy Azmoon, San Diego, CA (US); Dorit Zilbershot, Waltham, MA (US); Gaurav Goyal, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 198 days.

(21) Appl. No.: 18/659,677

(22) Filed: May 9, 2024

(65) Prior Publication Data

US 2024/0378391 A1 Nov. 14, 2024

Related U.S. Application Data

(60) Provisional application No. 63/466,064, filed on May 12, 2023.

(51) Int. Cl.
*G06F 40/35* (2020.01)
*G10L 15/16* (2006.01)
(Continued)

(52) U.S. Cl.
CPC .............. *G06F 40/35* (2020.01); *G10L 15/18* (2013.01); *G10L 15/16* (2013.01); *G10L 15/22* (2013.01);
(Continued)

(58) Field of Classification Search
CPC ....... G10L 15/16; G10L 15/183; G10L 15/22; G10L 2015/223; G10L 2015/228; G06F 40/35; G06F 40/56
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

CA 3119236 A1 11/2022
CN 116991406 A 11/2023
(Continued)

OTHER PUBLICATIONS

Office Action, U.S. Appl. No. 18/768,340, mailed Mar. 6, 2025.
(Continued)

*Primary Examiner* — James S Wozniak
(74) *Attorney, Agent, or Firm* — McDonnell Boehnen Hulbert & Berghoff LLP

(57) ABSTRACT

An example embodiment may include: receiving, from an application, a request, wherein the request includes textual content; in response to receiving the request, determining a context relating to the textual content; generating, from the textual content and the context, a prompt for a natural language model; transmitting, to the natural language model, the prompt; receiving, from the natural language model, a response to the prompt, wherein the response includes information relevant to the request or programmatic commands; and providing, to the application, further textual content that is based on the response.

18 Claims, 43 Drawing Sheets

(51) Int. Cl.
*G10L 15/18* (2013.01)
*G10L 15/22* (2006.01)

(52) U.S. Cl.
CPC .. *G10L 2015/223* (2013.01); *G10L 2015/228* (2013.01)

(58) Field of Classification Search
USPC .................................... 704/9, 232, 270, 275
See application file for complete search history.

(56) References Cited

U.S. PATENT DOCUMENTS 5,237,518 A 8/1993 Sztipanovits et al.
5,261,097 A 11/1993 Saxon
5,265,252 A 11/1993 Rawson, III et al.
5,367,685 A 11/1994 Gosling
5,390,297 A 2/1995 Barber et al.
5,442,791 A 8/1995 Wrabetz et al.
5,452,415 A 9/1995 Hotka
5,522,042 A 5/1996 Fee et al.
5,533,116 A 7/1996 Vesterinen
5,655,081 A 8/1997 Bonnell et al.
5,659,736 A 8/1997 Hasegawa et al.
5,671,412 A 9/1997 Christiano
5,696,701 A 12/1997 Burgess et al.
5,715,463 A 2/1998 Merkin
5,745,879 A 4/1998 Wyman
5,761,502 A 6/1998 Jacobs
5,764,913 A 6/1998 Jancke et al.
5,887,139 A 3/1999 Madison, Jr. et al.
5,909,217 A 6/1999 Bereiter
5,937,165 A 8/1999 Schwaller, II et al.
5,949,976 A 9/1999 Chappelle
5,978,594 A 11/1999 Bonnell et al.
6,021,437 A 2/2000 Chen
6,041,347 A 3/2000 Harsham et al.
6,088,717 A 7/2000 Reed et al.
6,101,500 A 8/2000 Lau
6,128,016 A 10/2000 Coelho et al.
6,131,118 A 10/2000 Stupek, Jr. et al.
6,134,581 A 10/2000 Ismael et al.
6,138,122 A 10/2000 Smith et al.
6,148,335 A 11/2000 Haggard et al.
6,166,732 A 12/2000 Mitchell et al.
6,167,448 A 12/2000 Hemphill et al.
6,175,866 B1 1/2001 Holloway et al.
6,175,878 B1 1/2001 Seaman et al.
6,260,050 B1 7/2001 Yost et al.
6,263,457 B1 7/2001 Anderson et al.
6,272,150 B1 8/2001 Hrastar et al.
6,336,138 B1 1/2002 Caswell et al.
6,363,421 B2 3/2002 Barker et al.
6,393,386 B1 5/2002 Zager et al.
6,397,245 B1 5/2002 Johnson, II et al.
6,434,626 B1 8/2002 Prakash et al.
6,438,592 B1 8/2002 Killian
6,456,306 B1 9/2002 Chin et al.
6,466,932 B1 10/2002 Dennis et al.
6,487,590 B1 11/2002 Foley et al.
6,505,248 B1 1/2003 Casper et al.
6,526,442 B1 2/2003 Stupek, Jr. et al.
6,621,823 B1 9/2003 Mellquist et al.
6,707,795 B1 3/2004 Noorhosseini et al.
6,742,015 B1 5/2004 Bowman-Amuah
6,763,380 B1 7/2004 Mayton et al.
6,816,898 B1 11/2004 Scarpelli et al.
6,895,586 B1 5/2005 Brasher et al.
6,948,175 B1 9/2005 Fong et al.
6,985,901 B1 1/2006 Sachse et al.
7,003,564 B2 2/2006 Greuel et al.
7,028,228 B1 4/2006 Lovy et al.
7,043,537 B1 5/2006 Pratt
7,043,661 B2 5/2006 Valadarsky et al.
7,062,683 B2 6/2006 Warpenburg et al.
7,096,459 B2 8/2006 Keller et al.
7,146,574 B2 12/2006 Goldthwaite et al.
7,197,466 B1 3/2007 Peterson et al.
7,215,360 B2 5/2007 Gupta
7,216,304 B1 5/2007 Gourdol et al.
7,222,147 B1 5/2007 Black et al.
7,281,170 B2 10/2007 Taylor et al.
7,328,260 B1 2/2008 Muthiyan et al.
7,412,502 B2 8/2008 Fearn et al.
7,505,872 B2 3/2009 Keller et al.
7,593,013 B2 9/2009 Agutter et al.
7,596,716 B2 9/2009 Frost et al.
7,617,073 B2 11/2009 Trinon et al.
7,660,731 B2 2/2010 Chaddha et al.
7,676,294 B2 3/2010 Baier et al.
7,676,437 B2 3/2010 Satkunanathan et al.
7,757,185 B2 7/2010 Paquette
7,840,490 B1 11/2010 Sellers et al.
7,877,783 B1 1/2011 Cline et al.
7,890,869 B1 2/2011 Mayer et al.
7,966,398 B2 6/2011 Wiles, Jr.
8,060,396 B1 11/2011 Bessler et al.
8,196,210 B2 6/2012 Sterin
8,321,948 B2 11/2012 Robinson et al.
8,407,669 B2 3/2013 Yee et al.
8,543,690 B1 9/2013 Zeitoun
8,554,750 B2 10/2013 Rangarajan et al.
8,595,647 B2 11/2013 Sabin et al.
8,620,818 B2 12/2013 Hughes et al.
8,646,093 B2 2/2014 Myers et al.
8,674,992 B2 3/2014 Poston et al.
8,725,647 B2 5/2014 Disciascio et al.
9,053,460 B2 6/2015 Gilbert et al.
9,069,737 B1 6/2015 Kimotho et al.
9,684,882 B2 6/2017 Azmoon
9,971,826 B1 5/2018 Belmar
10,452,251 B2 10/2019 Yaseen
10,673,963 B1 6/2020 Feiguine et al.
10,740,568 B2 8/2020 Azmoon
10,749,943 B1 8/2020 Feiguine et al.
10,769,826 B2 9/2020 Azmoon
10,771,344 B2 9/2020 Bitterfeld et al.
10,824,650 B2 11/2020 Bar Oz et al.
10,867,610 B2 12/2020 Diamant
10,929,392 B1 2/2021 Cheng
10,944,654 B2 3/2021 Rimar et al.
10,999,152 B1 5/2021 Bar Oz et al.
11,003,318 B2 5/2021 Azmoon
11,025,481 B1 6/2021 Louca et al.
11,061,650 B2 7/2021 Turek
11,061,890 B2 7/2021 Steuer
11,080,490 B2 8/2021 Koohmarey
11,089,115 B2 8/2021 Garty et al.
11,095,506 B1 8/2021 Erblat et al.
11,150,784 B1 10/2021 Azmoon
11,244,484 B2 2/2022 Dubey
11,265,204 B1 3/2022 A
11,275,580 B2 3/2022 Tamir et al.
11,277,475 B1 3/2022 Tal et al.
11,281,442 B1 3/2022 Tal et al.
11,294,666 B1 4/2022 Look
11,296,922 B2 4/2022 Leibkowiz et al.
11,301,503 B2 4/2022 Burli
11,379,089 B2 7/2022 Goswami et al.
11,423,234 B2 8/2022 De Ridder
11,431,824 B2 8/2022 Currier
11,451,573 B2 9/2022 Waplington
11,470,107 B2 10/2022 Waplington
11,481,416 B2 10/2022 Dua
11,494,396 B2 11/2022 Li
11,513,655 B2 11/2022 Narayanan
11,579,841 B1 * 2/2023 Eich ...................... G06F 9/4881
11,582,106 B2 2/2023 Hameiri et al.
11,616,690 B2 3/2023 Feiguine et al.
11,625,141 B2 4/2023 Azmoon
11,630,717 B2 4/2023 Vutukuru et al.
11,632,303 B2 4/2023 Bitterfeld et al.
11,640,369 B2 5/2023 Bhogle et al.
11,671,444 B2 6/2023 Waplington
11,695,641 B2 7/2023 Bar Oz et al.

(56) References Cited

U.S. PATENT DOCUMENTS 11,829,233 B2 11/2023 Watkins et al.
11,868,593 B2 1/2024 Bradley et al.
11,956,116 B2 4/2024 R
12,462,095 B2 * 11/2025 Asi ......................... G06F 40/56
12,475,887 B2 * 11/2025 Lu ......................... G10L 15/063
2002/0116340 A1 8/2002 Hellberg et al.
2002/0133392 A1 9/2002 Angel
2002/0133584 A1 9/2002 Greuel et al.
2002/0158969 A1 10/2002 Gupta
2003/0118087 A1 6/2003 Goldthwaite et al.
2003/0200293 A1 10/2003 Fearn et al.
2005/0015217 A1 1/2005 Weidl et al.
2005/0091356 A1 4/2005 Izzo
2006/0026453 A1 2/2006 Frost et al.
2006/0095461 A1 5/2006 Raymond
2006/0179058 A1 8/2006 Bram et al.
2006/0288053 A1 12/2006 Holt et al.
2006/0293942 A1 12/2006 Chaddha et al.
2007/0033279 A1 2/2007 Battat et al.
2007/0188494 A1 8/2007 Agutter et al.
2007/0288389 A1 12/2007 Vaughan et al.
2008/0133289 A1 6/2008 Armour et al.
2008/0148253 A1 6/2008 Badwe et al.
2008/0319779 A1 12/2008 Hughes et al.
2009/0088875 A1 4/2009 Baier et al.
2009/0228984 A1 9/2009 Sterin
2010/0110932 A1 5/2010 Doran et al.
2011/0131491 A1 6/2011 Lu
2011/0289409 A1 11/2011 Batey
2013/0067390 A1 3/2013 Kwiatkowski
2013/0067398 A1 3/2013 Pittappilly
2013/0283273 A1 10/2013 Miyazaki
2014/0122427 A1 5/2014 Dary
2014/0257793 A1 9/2014 Gandrabur
2015/0033269 A1 1/2015 Azmoon
2016/0293164 A1 * 10/2016 Shi ...................... G10L 15/1815
2017/0147296 A1 5/2017 Kumar
2018/0101506 A1 4/2018 Hodaei
2018/0123940 A1 5/2018 Rimar et al.
2018/0307404 A1 10/2018 Azmoon
2019/0073257 A1 3/2019 Dasgupta et al.
2019/0103092 A1 4/2019 Rusak
2019/0104398 A1 4/2019 Owen et al.
2019/0129739 A1 5/2019 Al Reza et al.
2019/0149515 A1 5/2019 Sharma et al.
2019/0165957 A1 5/2019 Abbott et al.
2019/0227822 A1 7/2019 Azmoon
2019/0250891 A1 8/2019 Kumar
2019/0311199 A1 10/2019 Mukherjee
2019/0342162 A1 11/2019 Bendre et al.
2020/0034462 A1 1/2020 Narayanasamy et al.
2020/0042579 A1 2/2020 Ben-Ishay
2020/0050689 A1 2/2020 Tal et al.
2020/0204443 A1 6/2020 Bar Oz et al.
2020/0227029 A1 7/2020 Mcconnell
2020/0285319 A1 9/2020 Sirpal
2020/0301678 A1 9/2020 Burman et al.
2020/0342850 A1 * 10/2020 Vishnoi ................. H04L 51/214
2020/0364294 A1 11/2020 Brown
2020/0372224 A1 11/2020 Azmoon
2020/0411004 A1 * 12/2020 Luo ......................... G06F 40/30
2021/0073293 A1 3/2021 Fenton
2021/0089325 A1 3/2021 Suryanarayana
2021/0097168 A1 4/2021 Patel et al.
2021/0194764 A1 6/2021 Badyan et al.
2021/0263641 A1 8/2021 Miriyala
2021/0279024 A1 9/2021 Boule
2021/0365181 A1 11/2021 Duggan
2022/0029886 A1 1/2022 Hameiri
2022/0091726 A1 3/2022 Azmoon
2022/0223142 A1 * 7/2022 Zhang ..................... G10L 15/04
2022/0300121 A1 9/2022 Goswami
2022/0303352 A1 9/2022 Herzog et al.
2022/0326907 A1 10/2022 Molina
2022/0415307 A1 * 12/2022 Kockerbeck .......... G10L 15/183
2023/0049030 A1 2/2023 Azmoon
2023/0125823 A1 4/2023 Shi
2023/0208869 A1 6/2023 Bisht
2023/0214193 A1 7/2023 Makhija
2023/0229542 A1 7/2023 Watkins et al.
2023/0245651 A1 8/2023 Wang
2023/0282218 A1 9/2023 Moynihan
2023/0315856 A1 10/2023 Lee
2023/0316006 A1 * 10/2023 Tunstall-Pedoe .... G06N 3/0442
704/9
2023/0376284 A1 11/2023 Shi
2024/0016997 A1 1/2024 Hickmott
2024/0096312 A1 * 3/2024 Gupta ................... G10L 15/063
2024/0135611 A1 * 4/2024 Costin ..................... G06T 11/60
2024/0144922 A1 * 5/2024 Pandita ................... G10L 15/22
2024/0161365 A1 * 5/2024 Mene ......................... G06T 5/00
2024/0169623 A1 5/2024 Zeng
2024/0169974 A1 * 5/2024 Bonar ..................... G10L 13/10
2024/0264723 A1 * 8/2024 Davidson ............... G06N 3/045
2024/0281619 A1 * 8/2024 Koneru ................... G06F 40/35
2024/0282298 A1 * 8/2024 Koneru ................. G10L 15/183
2024/0289360 A1 * 8/2024 Chepkwony ........ G06F 16/3328
2024/0290331 A1 * 8/2024 Lu ......................... G10L 15/063
2024/0296314 A1 * 9/2024 Singh .................. G06F 16/2471
2024/0320872 A1 9/2024 Hinz
2024/0338554 A1 10/2024 Schmidt
2024/0354319 A1 * 10/2024 Dinu ....................... G06F 40/35
2024/0354503 A1 * 10/2024 Baruch ................. G06F 16/345
2024/0354514 A1 * 10/2024 Valstar ................... A61B 5/024
2024/0362208 A1 10/2024 Naufel
2024/0371089 A1 * 11/2024 Yang .................... G06N 3/0455
2024/0378391 A1 11/2024 Bradley
2024/0378393 A1 11/2024 El Hattami
2024/0386038 A1 * 11/2024 Amershi ............. G06F 16/3329
2024/0386040 A1 * 11/2024 Lee ..................... G06F 16/3329
2024/0403567 A1 12/2024 Dressler, II
2024/0412031 A1 12/2024 Rayman
2024/0420239 A1 12/2024 Chen
2025/0077902 A1 3/2025 Wittekind
2025/0087315 A1 3/2025 Bonageri
2025/0139138 A1 5/2025 Hays
2025/0181420 A1 6/2025 Talavera
2025/0238414 A1 7/2025 Zaidi
2025/0244735 A1 7/2025 Denison

FOREIGN PATENT DOCUMENTS

EP 0433979 A2 6/1991
EP 1607824 A2 12/2005
WO 9934285 A1 7/1999
WO 0052559 A1 9/2000
WO 0179970 A1 10/2001
WO 2019136001 A1 7/2019

OTHER PUBLICATIONS

Office Action, U.S. Appl. No. 18/768,340, mailed Aug. 13, 2025.
Office Action, U.S. Appl. No. 18/425,491, mailed Feb. 6, 2026.
Office Action, U.S. Appl. No. 18/425,506, mailed Feb. 2, 2026.
Office Action, U.S. Appl. No. 18/768,340, mailed Dec. 23, 2025.

* cited by examiner

670

```
{
 "skill_id": "it_support_request",
 "skill_name": "IT Support Request Handler",
 "description": "Processes incoming IT support requests and routes them to the appropriate
team.",
 "active": true,
 "triggers": [
  {
   "trigger_type": "natural_language",
   "keywords": ["IT support", "computer issue", "helpdesk", "technical support"]
  }
 ],
 "actions": [
  {
   "action_type": "create_incident",
   "fields": {
    "short_description": "{{user_query}}",
    "category": "IT",
    "sub_category": "Technical Support",
    "urgency": "medium",
    "assignment_group": "IT Support Team"
   }
  },
  {
   "action_type": "message_user",
   "message": "Your IT support request has been received and will be processed shortly. You
will receive updates via email."
  }
 ],
 "escalation": {
  "timeout_seconds": 300,
  "escalation_message": "Your request is taking longer than usual. Would you like to speak
with a live agent?"
 }
}
```

FIG. 6D

SERVICE PLATFORM INTEGRATION WITH GENERATIVE NATURAL LANGUAGE MODELS

CROSS-REFERENCE TO RELATED APPLICATION

This application claims priority to U.S. provisional patent application No. 63/466,064, filed May 12, 2023, which is hereby incorporated by reference in its entirety.

BACKGROUND

Large language models (LLMs) are a form of generative artificial intelligence with many potential uses. Currently, many of these models are used to drive virtual agents (e.g., chatbots) as well as in applications corresponding to research assistance, language translation, text generation, and other types of natural language processing (NLP) tasks. Without fine tuning and/or retraining, LLMs typically cannot perform specific tasks efficiently. Therefore, in their current state, LLMs have limited applicability when integrated with platform-as-a-service software architectures. As a consequence, attempts to do so involve wastage of computing resources (e.g., processing, memory, and network capacity) as users are forced to employ LLMs and LLM-assisted interfaces in a trial and error fashion.

SUMMARY

The embodiments herein overcome these and possibly other drawbacks and restrictions to the state of the art by supplying application, user, and/or platform information to an LLM in the form of sophisticated contextual prompts. This results in the LLM providing, in response to the prompts, highly relevant responses that can facilitate improved user interaction with task-based applications, workflows, user interface building tools, and agent interfaces, just to name a few uses. In this manner, computing resources are preserved, as users are able to obtain useful responses in fewer attempts.

Accordingly, a first example embodiment may involve receiving, from an application, a request, wherein the request includes textual content; in response to receiving the request, determining a context relating to the textual content; generating, from the textual content and the context, a prompt for a natural language model; transmitting, to the natural language model, the prompt; receiving, from the natural language model, a response to the prompt, wherein the response includes information relevant to the request or programmatic commands; and providing, to the application, further textual content that is based on the response.

A second example embodiment may involve a non-transitory computer-readable medium, having stored thereon program instructions that, upon execution by a computing system, cause the computing system to perform operations in accordance with any previous embodiment.

In a third example embodiment, a computing system may include at least one processor, as well as memory and program instructions. The program instructions may be stored in the memory, and upon execution by the at least one processor, cause the computing system to perform operations in accordance with any previous embodiment.

In a fourth example embodiment, a system may include various means for carrying out each of the operations of any previous embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6D depicts a representation of a skill, in accordance with example embodiments.

DETAILED DESCRIPTION

Figure 1:
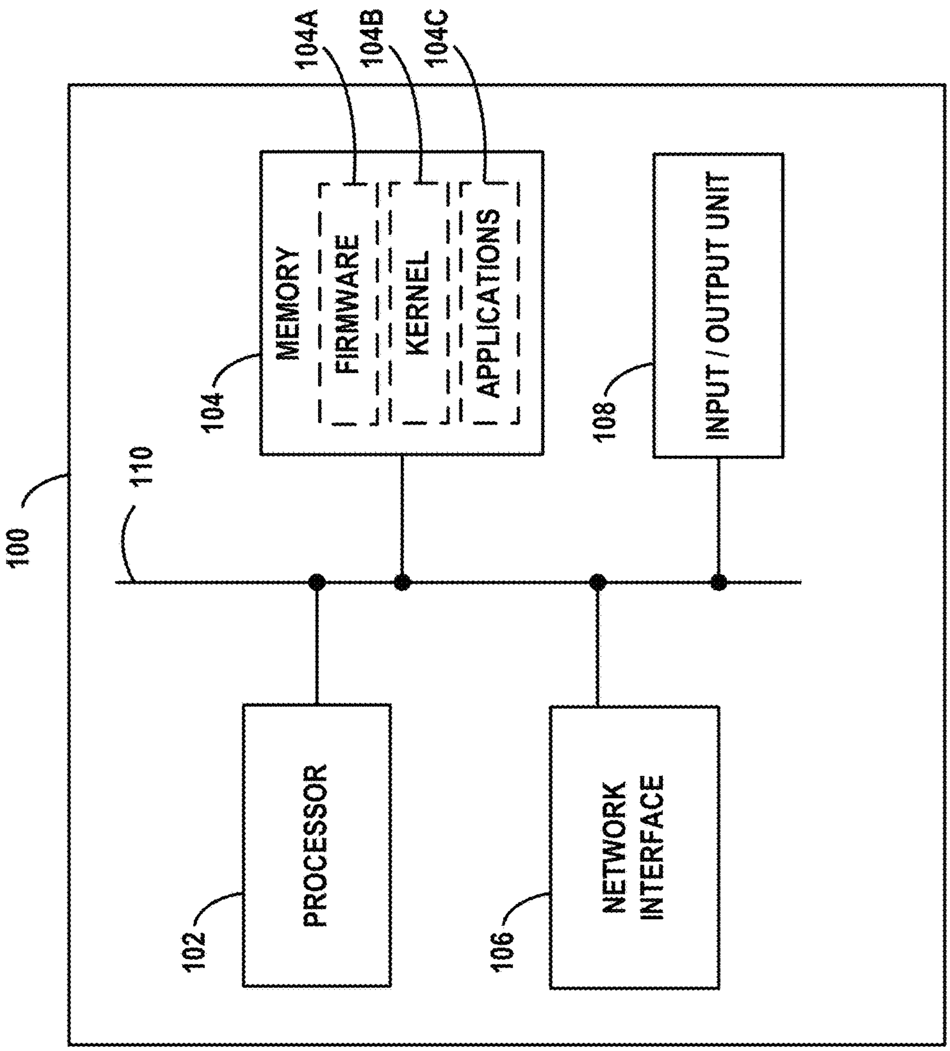
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Technical Improvements

These embodiments provide a technical solution to a technical problem. One technical problem being solved is the integration of LLMs into highly contextual user interfaces and applications. In practice, this is problematic because LLMs are generic and often stateless language processors and not fine-tuned to specific applications and services.

In the prior art, there was no LLM integration, and AI assistance was very limited, mainly focusing on finding similarities between items in various databases. However, these techniques do not provide natural conversational interfaces or the contextual, summarizing and/or suggesting features described herein. Moreover, naïve integration of a general LLM is subject to LLM hallucinations (in which the LLM misinterprets or fabricates data) and could result in inaccurate or offensive content. Thus, prior art techniques did little if anything to address the limitations of AI assistance.

Furthermore, even without AI assistance, user confusion over how to effectively interact within a user interface can lead to wastage of computing resources (e.g., processing, memory, and/or network capacity). For example, a user may reload user interface pages or sections, backtrack to previous user interface pages, and/or submit the same information more than once before it is finalized.

The embodiments herein overcome these limitations by furnishing contextual information regarding applications, their database entries, their user interfaces, and the relevant users into sophisticated LLM prompts. In this manner, vastly superior AI assistance that converses in a way that appears natural to humans can be accomplished in an accurate and robust fashion. This results in several advantages. First, massive amounts of user and agent time are saved by avoiding a human having to write chat messages, notes, and articles. Second, use of an LLM with contextual prompting does not suffer from human subjectivity and variability that can make human writing unclear or difficult to understand. Third, user interfaces can be designed and developed more easily and rapidly with auto-generated components based on natural language requests. Fourth, computing resource wastage is mitigated by facilitating efficient user interaction with one or more applications.

Other technical improvements may also flow from these embodiments, and other technical problems may be solved. Thus, this discussion of technical improvements is non-limiting.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVAR byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
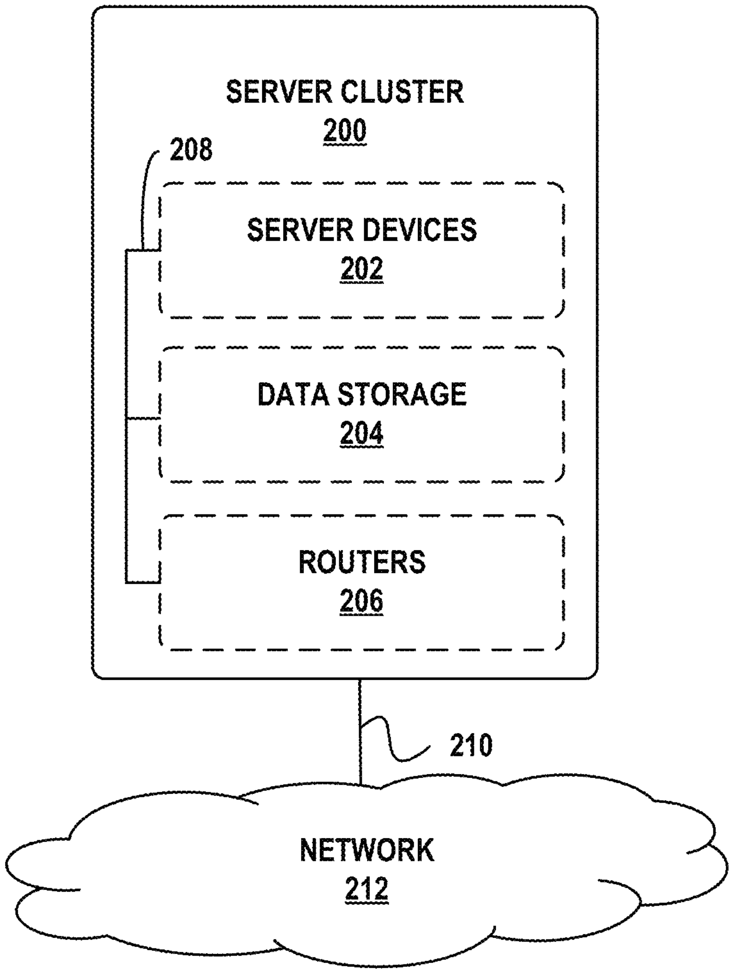
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), JavaScript Object Notion (JSON), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
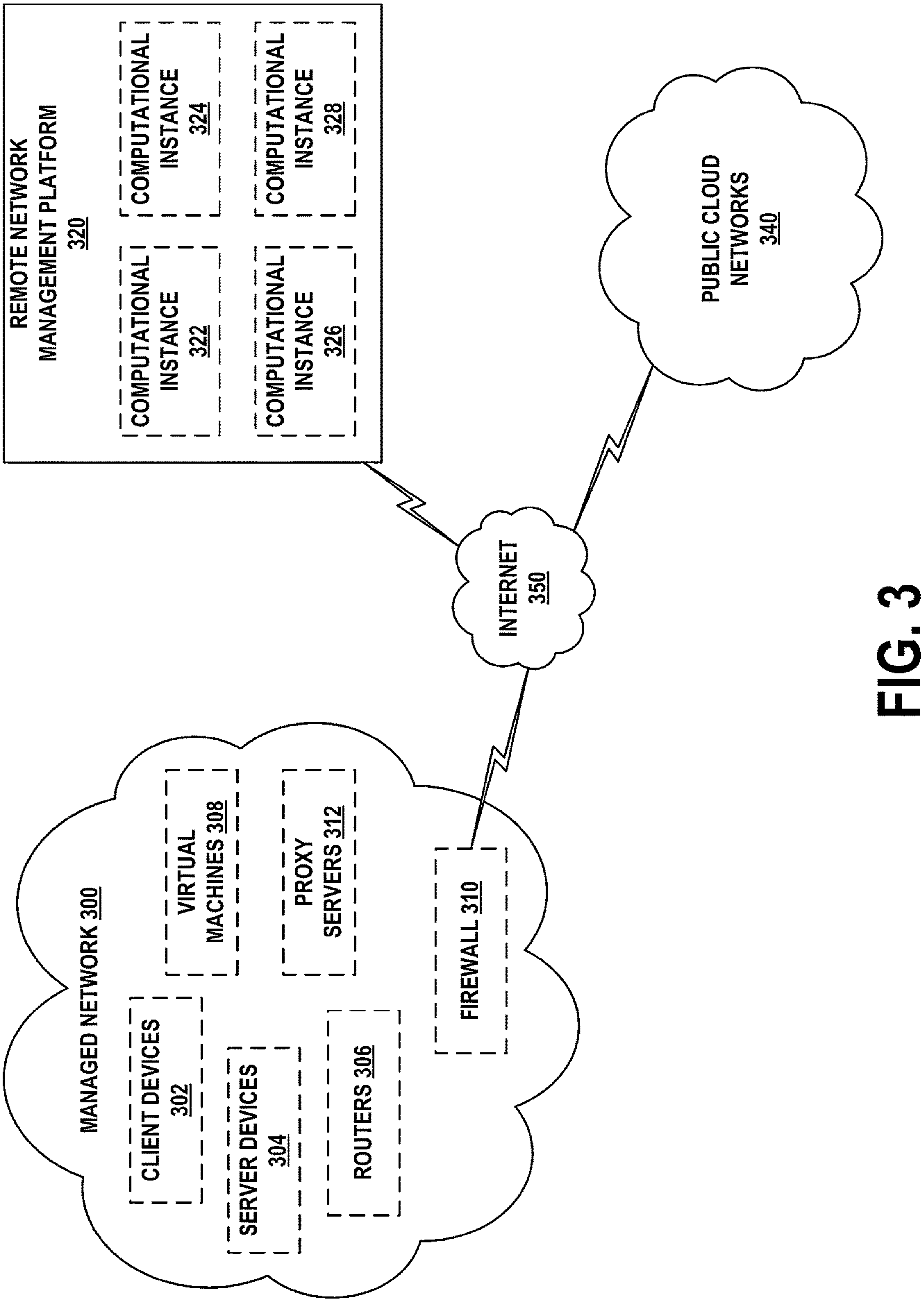
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
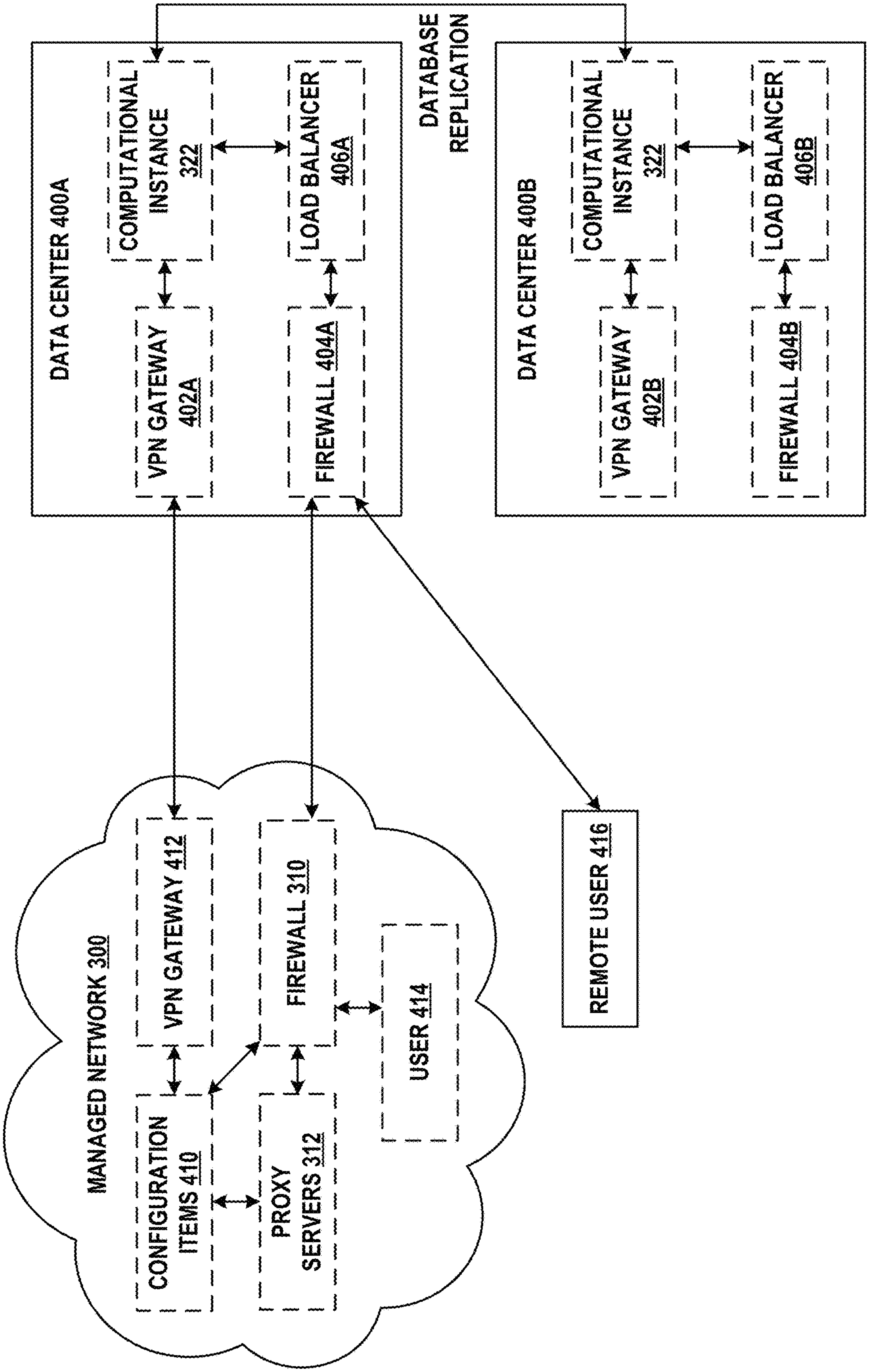
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
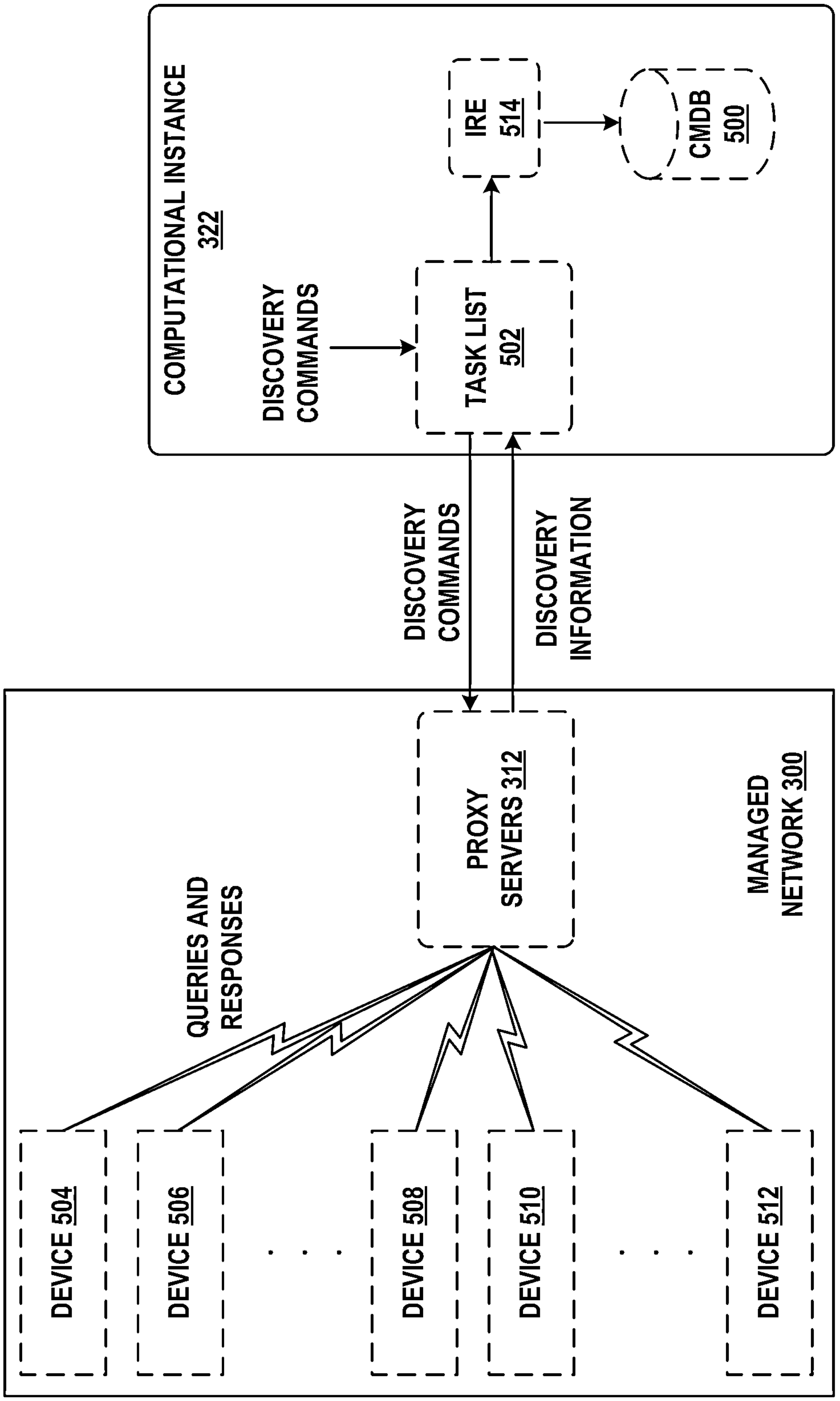
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Example Platform Applications

As noted, remote network management platform 320 may support a number of applications and services, each of which may use or involve information from CMDB 500 and/or other databases as needed. Some of these applications and services may include task-based applications, workflows, user interface building tools, and agent interfaces, just to name a few. Other applications and services not explicitly discussed herein may benefit from the disclosed embodiments.

A. Task-Based Applications

Remote network management platform 320 may furnish various IT service management (ITSM) solutions including task-based applications designed to streamline and manage specific processes. Three prominent examples are incident management, case management, and problem management.

Incident management focuses on the efficient resolution of IT service disruptions or incidents. When an issue or disruption occurs, it is logged as an incident in the incident management application. This application allows IT teams to track and manage these incidents throughout their lifecycles. It includes features such as incident creation/generation, assignment, prioritization, escalation, communication, and resolution. The incident management application provides workflows, notifications, and collaboration tools to facilitate the prompt and efficient addressing of incidents, with a goal of minimizing their impact on platform and system operations.

Case management is designed to handle diverse types of processes, requests, or workflows. It enables users to manage complex cases that require coordination across multiple groups. The case management application provides a unified platform to capture, track, and manage cases from initiation to resolution. It includes features such as case creation, classification, assignment, task tracking, collaboration, and closure. This application can be tailored to various use cases, such as HR inquiries, legal matters, facilities management, and customer support escalations among others.

Problem management is drawn to identifying and addressing the root causes of recurring incidents or issues. It helps IT teams identify underlying problems that lead to multiple incidents, analyze their impact, and initiate appropriate actions for resolution. The problem management application provides tools for problem identification, investigation, prioritization, and tracking. It allows users to link related incidents, perform root cause analysis, define workarounds or solutions, and track the progress of problem resolution. The application helps groups minimize the occurrence and impact of recurring issues, leading to improved service quality and stability for the platform and other systems.

B. Workflows

As noted, task-based applications may employ or be integrated with workflows in some fashion. Here, a workflow defines a sequence of activities and operations used to automate and streamline processes. These workflows may include conditions and branching logic, enabling different paths within the workflow based on specific criteria, such as the values or states of variables or data.

Workflows can be integrated with other applications operable on remote network management platform 320, such as the task-based applications described above. This integration enables cross-application coordination process synchronization. Further, remote network management platform 320 can integrate workflows with external systems and applications through web services or API calls. This allows for data exchange and collaboration with third-party tools, enabling end-to-end process automation and information sharing.

Remote network management platform 320 may include a workflow designer application that allows users to create, modify, and manage workflows using a drag-and-drop user interface. The application provides a graphical representation of the workflow, making it easier to understand and configure the ordering of activities in the workflow. The application may also provide pre-built workflow templates and libraries that offer ready-to-use workflows for common processes. These templates can be customized to meet specific needs, thus accelerating the implementation of workflows.

C. User Interface Building Tools

Remote network management platform 320 may provide a user interface builder application that is a visual design tool for creating and customizing user interfaces within the platform. This application may employ a low-code/no-code approach to designing intuitive graphical user interfaces, enabling administrators and developers to build components without extensive coding knowledge.

The user interface builder application may include a drag-and-drop interface that simplifies the process of creating user interfaces. Users can add and arrange user interface components such as fields, buttons, containers, tables, and images onto the canvas, eliminating the need for manual coding. In doing so, the application may rely on a library of pre-built user interface components that users can choose from, including form fields, widgets, buttons, and navigation elements. These components can be added to the canvas and customized according to specific needs.

These user interface components may be bound to data sources within remote network management platform 320. This enables dynamic data display, real-time updates, and synchronization between the user interface and underlying data. The application also allows integration with other applications and workflows, as well as the use of conditional logic (e.g., visibility rules, triggering of actions, etc.) to create interactive and context-aware user interfaces.

D. Virtual Agents

Remote network management platform 320 may also support virtual agents. These can be artificial-intelligence powered conversational interfaces designed to interact with users and provide automated assistance. Virtual agents can be integrated into various interfaces and applications, such as web portals, chat interfaces, and messaging platforms to offer self-service options and enhance the user experience. The virtual agents operable on remote network management platform 320 are different from the virtual agent features of an LLM. Notably, platform virtual agents may employ LLMs in some situations, but can also operate based on local platform content and pre-defined dialog trees, for example.

Virtual agents can engage in dynamic and context-rich conversations with users. They can guide users through predefined conversation flows, prompt for information, ask clarifying questions, and provide relevant responses or recommendations based on the user's needs. These virtual agents can be integrated with a knowledge base, which contains a repository of articles, frequently-asked questions (FAQs), and troubleshooting information. Virtual agents can access this knowledge base to retrieve relevant information and provide self-help resources to users. Virtual agents can also automate common tasks or processes within the platform. They can initiate workflows, create tasks, perform system actions, or provide status updates, allowing users to complete tasks without manual intervention.

Further, virtual agents can transfer conversations to live (human) agents when necessary or desirable. If a virtual agent cannot resolve a user's query or if the user requests human assistance, the conversation can be handed off to a live agent for further support and resolution. Such a handoff may involve providing, to the live agent, the context (and possibly some or all of the content) of the conversation between the user and the virtual agent.

VIII. LLM Integration

A large language model (LLM) is an advanced computational model, primarily functioning within the domain of natural language processing (NLP) and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a deep neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

Upon receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including but not limited to, chatbot development, content creation, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

Figure 6A:
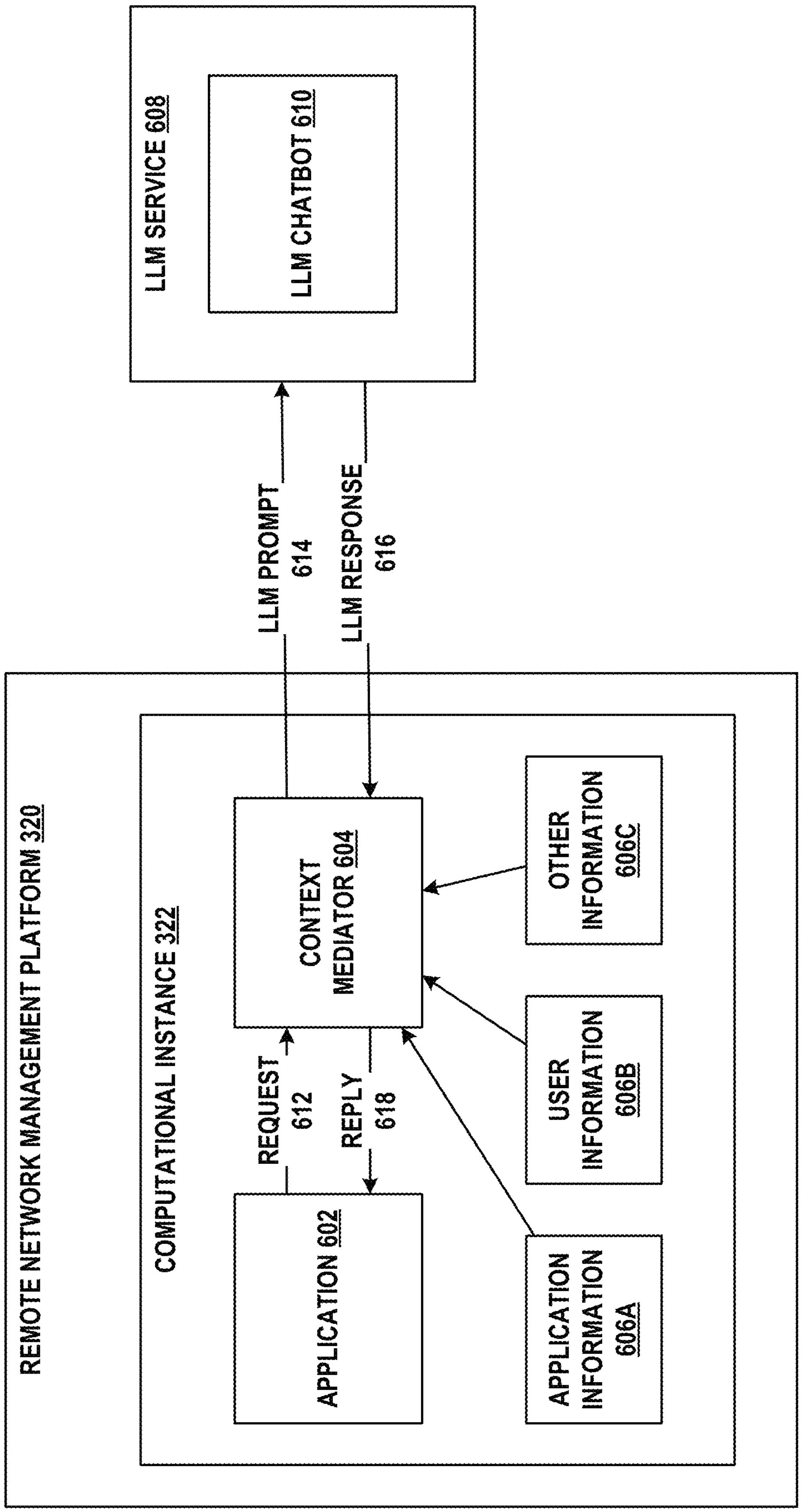
FIG. 6A depicts integration of an LLM with a remote network management platform, in accordance with example embodiments.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret and produce images and/or audio FIG. 6A depicts integration of an LLM with a remote network management platform. Remote network management platform 320 includes computational instance 322 (in addition to other computational instances). Computational instance 322, in turn, provides the infrastructure for application 602 (in addition to other applications) to execute. Also executable on computational instance 322 is context mediator 604.

Context mediator 604 may be one or more applications that can serve as an intelligent proxy between application 602 and LLM service 608. Notably, a user of application 602 may submit request 612. Request 612 may be a textual request relating to how the user is interacting with application 602. For example, if application 602 is an incident management application, request 612 might be "Display all unresolved high priority incidents." On the other hand, if application 602 is a user interface builder application, request 612 might be "Generate a chart of average time to resolve high priority incidents."

From such request 612, content mediator 604 may generate LLM prompt 614. In doing so, content mediator may use contextual information stored on or available to computational instance 322. This contextual information may include, but is not limited to, application information 606A, user information 606B, and other information 606C. Application information 606A may include contextual information relating to application 602, such the database tables it uses, their fields, values that can be stored in these fields, as well as general application state. User information 606B may include the user's personal information (e.g., name, postal address, phone number, and/or email address), userid, role and permissions on computational instance 322, historical information (e.g., previous prompts and user preferences), and so on. Other information 606C may include any additional information that computational instance 322 may access to that could be relevant to generating LLM prompt 614.

Context mediator 604 may be pre-configured with a number of canonical prompts that can be modified based on request 612, application information 606A, user information 606B, and/or other information 606C. An example canonical prompt might be "Provide an SQL query to obtain all incidents from a database table with the following schema [SCHEMA] that matches the following criteria [CRITERIA]." The placeholders [SCHEMA] and [CRITERIA] are replaced by contextual information, and then the prompt is sent to LLM service 608 as LLM prompt 614. Context mediator 604 may also have the ability to take into account any form of textual metadata when generating LLM prompt 614. This metadata may be platform-specific such as descriptions or definitions of user interface pages, user interface components, database tables, database entries, and so on. In some cases, the metadata may be in a structured format, such as JSON or XML.

If context moderator 604 does not have enough information to generate LLM prompt 614, it may request any missing information from the user. For example, context moderator 604 may ask the user "When you say 'high priority incidents' which of the following do you mean: P1, P2, P3, or P4 incidents?" or "Do you want a bar chart or pie chart?" Here, incidents that are deemed the most urgent and the highest priority are labeled P1, with less urgent/lower priority incidents labeled P2, and so on for P3 and P4 incidents. The responses to these questions may be used along with request 612 to generate LLM prompt 614. Notably, context generator 604 may include a virtual agent interface to facilitate this interaction with the user.

LLM service 608 may be a third-party service remotely accessible to computational instance 322 by way of an API. Alternatively, LLM service 608 could be operable on remote network management platform 320. LLM service 608 may include LLM chatbot 610, an application that receives LLM prompt 614 and generates LLM response 616 for transmission to context mediator 604. Notably, LLM chatbot 610 may operate on textual input and generate textual output. However, LLM chatbot 610 may be able to receive and understand certain types of graphical or audio input as well as produce graphical or audio output. For example, if LLM chatbot 610 is asked to generate a graph, LLM chatbot 610 may generate the graph in a textual form (e.g., using GraphML) or a graphical form (e.g., a PNG or JPEG file).

As noted above, LLMs are machine-learning constructs that can be trained on vast amounts of textual data, such as books, articles, and websites, to learn patterns and relationships between words and phrases. Some examples of LLMs include GPT-4, bidirectional encoder representations from transformers (BERT), language model for dialogue applications (LaMDA), and Transformer-XL. LLMs can perform a wide range of natural language processing tasks, such as summarization, text classification, question answering, and language translation. These LLMs also have the ability to create coherent and human-like text. Many LLMs are based on the transformer architecture, which employs self-attention when considering different parts of an input sequence (e.g., of tokens such as words) to compute a representation of each element in the sequence taking long-range dependence between elements into account.

In response to receiving LLM response 616 from LLM service 608 (e.g., from LLM chatbot 610), context mediator 604 may use and/or modify the content of LLM response 616 in order to generate reply 618. For instance, LLM response 616 might be an SQL query. In this case, context generator 604 may execute the SQL query on an appropriate database, then provide the results of the query in an appropriate format to the user in reply 618.

In some embodiments, the operations of context mediator 604 may be governed by a finite set of pre-defined skills. These skills may include techniques for interacting with databases, third-party tools, different types of users, and for different types of applications. Thus, the operations of context mediator 604 may involve, for requests and LLM responses, first determining the appropriate skill to invoke based on context, and then invoking that skill.

In this manner, the user does not have to provide a potentially complex and extensive amount of information to an LLM directly. Instead, context mediator 604 effectively translates the user's relatively simple natural language requests into specific LLM prompts that are more likely to result in LLM responses that are relevant to the user's needs. Further, context mediator 604 can modify the LLM responses so that they are more user friendly and/or in a desired form.

Figure 6B:
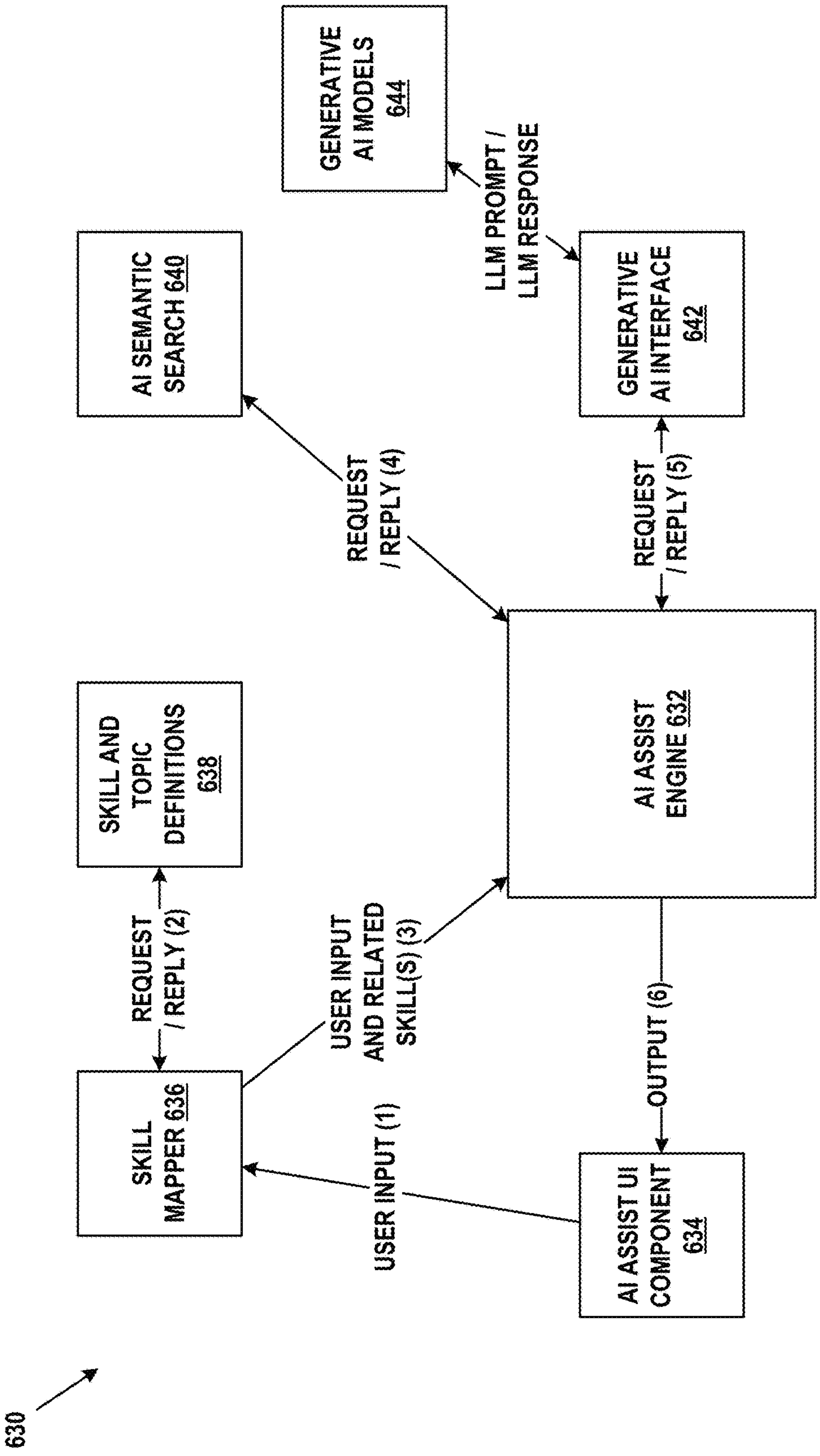
FIGS. 6B and 6C depict further aspects of LLM integration, in accordance with example embodiments.
Figure 6C:
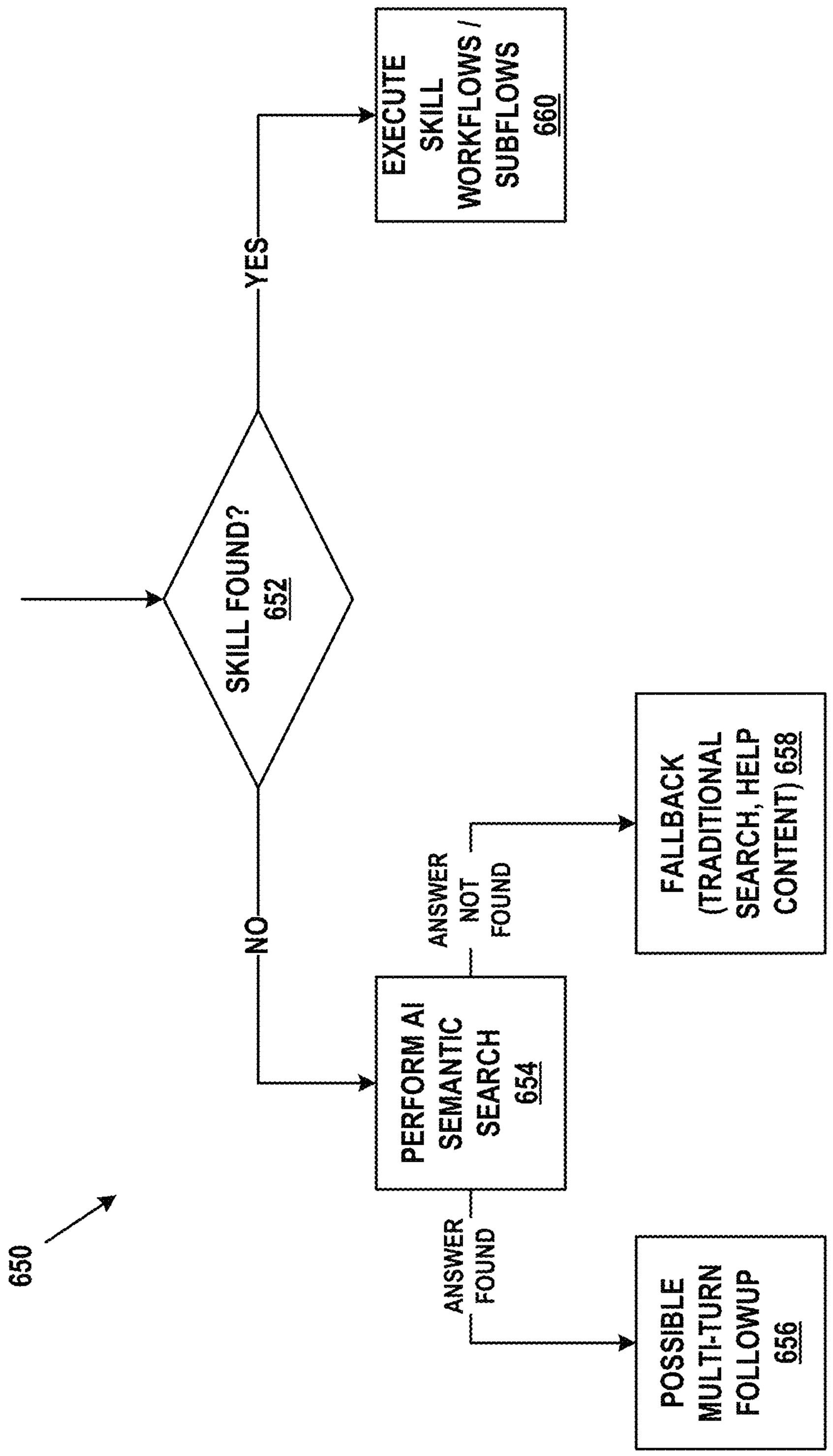

FIGS. 6B, 6C, and 6D depict further aspects of LLM integration with a remote network management platform. These aspects present a different view into the systems and processes described in the context of FIG. 6A. Thus, the disclosure of FIGS. 6B, 6C, and/or 6D can be combined with that of FIG. 6A.

FIG. 6B depicts AI architecture 630, including software applications and/or data in the form of AI assist engine 632, AI assist user interface (UI) component 634, skill mapper 636, skill and topic definitions 638, AI semantic search 640, generative AI interface 642, and generative AI models 644. But more, fewer, or different features and functional separations may be possible.

AI assist engine 632 serves as an interface between user and various AI models, such as AI semantic search 640 and generative AI models 644. Not unlike context mediator 604, AI assist engine 632 combines user input with other data available to a computational instance (e.g., metadata representing configuration items, user interfaces, database entries, skills, and topics) to form requests (e.g., in the form of prompts) to AI models. These AI models provide replies that AI assist engine 632 can deliver to users, either with or without further processing or integration of the other data.

AI assist UI component 634 may be one of one or more web or other types of components that present input/output modalities through which a user can submit user input to AI assist engine 632. Thus, AI assist UI component 634 may take the form of a web-based chat interface, in which users enter textual or image-based queries and receive textual or image-based output in response. In some cases, audio or video input or output may be possible. Examples of AI assist UI component 634 can be found in the user interfaces below (i.e., the Now Assist component of FIGS. 7B-7D.

Skill mapper 636 may be software that receives user input by way of AI assist UI component 634 and determines one or more skills that can be used by AI assist engine 632 to satisfy the user's request. As noted, there may be a finite set of pre-defined skills including techniques for interacting with databases, third-party tools, different types of users, and for different types of applications. As examples, skills may relate to task-based applications, workflows, user interface building tools, agent interfaces, database access, integrations with other software or platforms, and so on. Skill mapper 636 may identify a skill based on keywords or keyphrases in the user input, or based on a semantic similarity analysis thereof.

Skill and topic definitions 638 may be used by skill mapper 636. The defined skills may include specific knowledge regarding the operation of remote network management platform 320 (e.g., its application architecture and operation, database schema, capabilities, etc.). Skills can be defined in a number of ways, in program code, data, or otherwise programmatically.

FIG. 6D provides an example skill definition 670 in JSON. Skill definition 670 includes the elements that name the skill, specify its triggers, and set forth the actions it takes. Element "skill_id" may be a unique identifier for the skill. Element "skill_name" may be a human-readable name for the skill. Element "description" may be a brief description of what the skill does. Element "active" may indicate whether the skill is currently active and should respond to triggers. Elements "triggers" defines the conditions under which this skill is invoked. In this example, it is based on keywords in natural language inputs. Element "actions" may be a list of actions the skill performs when triggered. This can include creating an incident and messaging the user with a confirmation, for instance. Element "fields" specifies the fields to be filled when creating a new incident record. Element "escalation" may contain settings for how to handle situations when the skill cannot fulfill the request promptly, including sending an escalation message and setting a timeout. But this is just one possible combination of form and content for a skill definition. Other possibilities exist.

A skill definition, such as skill definition 670, may be interpreted by AI assist engine 632, as a form of pseudo code. Thus, AI assist engine 632 may include a module that "executes" a skill in accordance with its definition. Regardless, skill mapper 636 may provide a representation of a skill or skills to AI assist engine 632. With such a representation of skills, AI assist engine 632 may employ the decision tree depicted in FIG. 6C to determine how it should utilize the skill to provide output to the user. Operations associated with FIG. 6C are discussed below may include invocation of AI semantic search 640 and/or generative AI interface 642.

AI semantic search 640 may include various techniques to perform similarity-based search, including use of vector space embeddings, tree-based indexing, graph techniques, dimensionality reduction, approximate nearest neighbor algorithms, and so on. For instance, vector space embeddings may encode words and phrases in an n-dimensional feature space and can be used to find nearest similar words and phrases (e.g., those with the shortest Euclidian distance).

Generative AI interface 642 may represent an API or other type of module that provides AI assist engine 632 with access to generative AI models 644. The latter may be remotely operated and controlled, or executable on the remote network management platform. Thus, some may be foundational LLMs that are commercially available from various parties, fine-tuned generative models specific to the remote network management platform or users thereof, open source models, or they may take some other form. Generative AI interface 642 may serve as a conduit between AI assist engine 632 and one or more of generative AI models 644.

In some embodiments, the components of FIG. 6B may interact with one another in a particular order in accordance with the numbering of various labels. Nonetheless, other orderings are possible.

At step (1), AI assist UI component 634 may receive user input and provide it to skill mapper 636. At step (2), skill mapper 636 may invoke skill and topic definitions 638. In doing so, skill mapper 636 may determine that the user input is related to a first set of skills. This set of skills might be quite large (e.g., numbering in the dozens). In some cases, the set of skills might be based on the persona of the user (e.g., the user's role or responsibility with respect to an application or service related to the user input). At step (3), these skills are provided to AI assist engine 632.

At step (4), AI assist engine 632 invokes AI semantic search 640 to narrow down the set of skills based on a similarity analysis between each of the skills and the user input. This may produce a much smaller resulting set of skills, perhaps only one to four or so. At step (5), AI assist engine 632 may invoke generative AI interface 642 with the user input and this smaller list of skills. Generative AI interface 642 may call on generative AI models 644 to determine a reply that addresses the user input based on one or more of the smaller list of skills. At step (6) output is provided to AI assist UI component 634.

In this manner, skill mapper 636, AI assist engine 632, and AI semantic search 640 work in conjunction with one another to perform multi-layer filtering of a large set of skills down to a small number that can be handled by generative AI interface 642.

FIG. 6C depicts a decision tree 650 that can be implemented and performed by these components to identify and/or execute a skill. Notably, any of blocks 656, 658, and 660 may specify a procedure through which output is provided to the user.

At block 652, it is determined whether a skill was found by skill mapper 636. If a skill was found, then at block 660 AI assist engine 632 may execute workflows and/or subflows defined by the skill. If a skill was not found, then at block 654 AI assist engine 632 may perform AI semantic search 640. If AI semantic search 640 finds one or more similar skills, then at block 656 AI assist engine 632 may engage in an optional multi-turn follow-up procedure to further refine and narrow down these skills. If AI semantic search 640 does not find an answer, then at block 658 AI semantic search 640 may use one or more of traditional searching (e.g., keyword searching) through databases or identify existing skills from knowledgebase articles, catalogs, help pages, and other forms of documentation.

As noted previously, FIGS. 6A-6D provide example techniques and others may be possible. These additional techniques may involve the same or similar components, and/or differently arranged components.

IX. Example LLM Integrations

The following subsections provide example graphical user interfaces depicting various types of LLM integrations in accordance with the embodiments herein. For example, the operations described in the context of FIGS. 6A-6D may be used to facilitate the user interface features described below. Nonetheless, other graphical user interfaces, integrations, and embodiments may be supported.

Furthermore, many of the figures discussed below contain mockups or renderings of graphical user interfaces. Thus, the components of these graphical user interfaces may be of different sizes, have different positions, or display different content. Further, not all components may be presented consistently between figures.

A. Integration with Applications

FIGS. 7A-7D depict a general LLM integration with an arbitrary application. Other applications can be integrated in the same or a similar fashion.

Figure 7A:
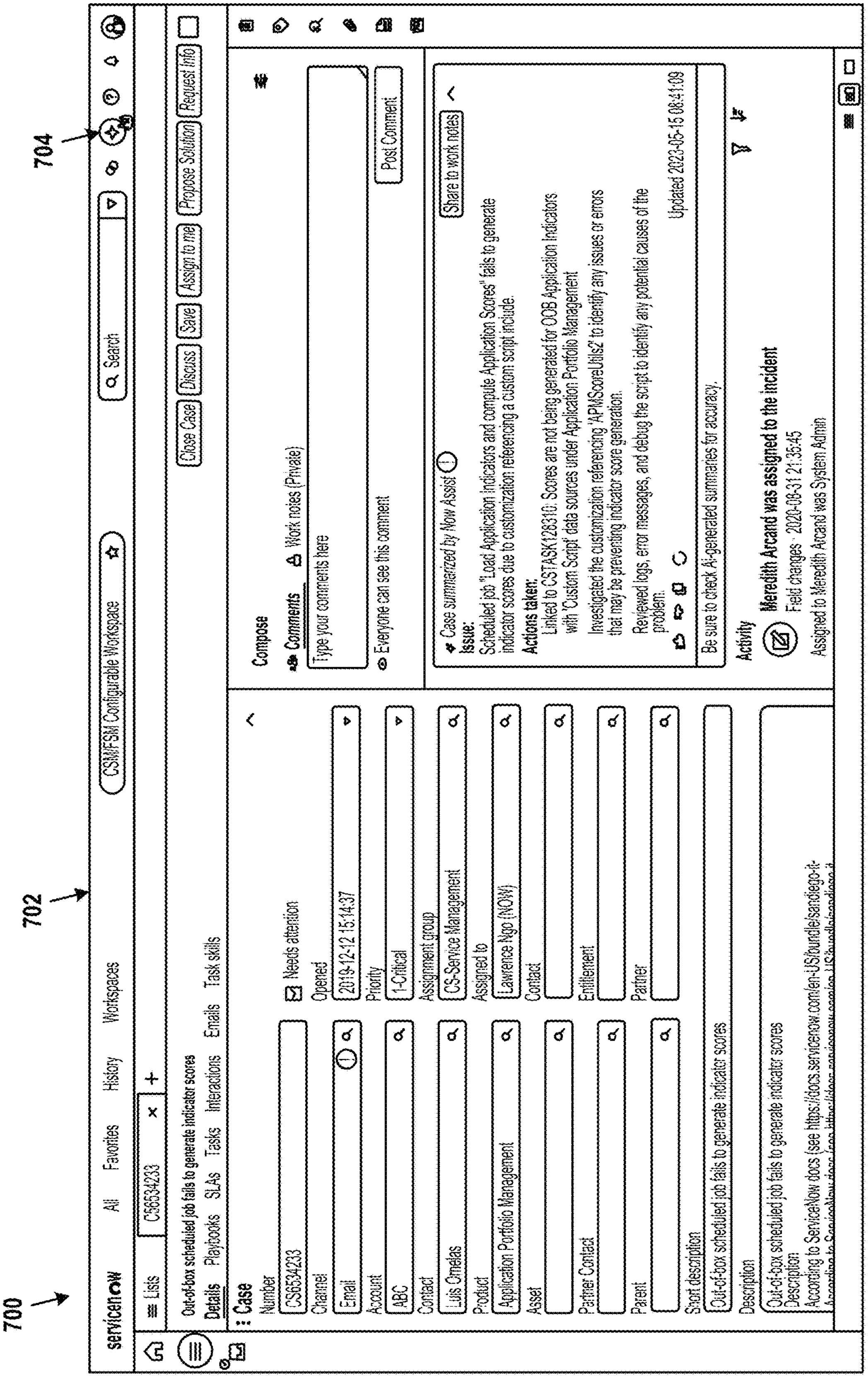
FIGS. 7A, 7B, 7C, and 7D depict a general LLM integration with an arbitrary application, in accordance with example embodiments.
Figure 7B:
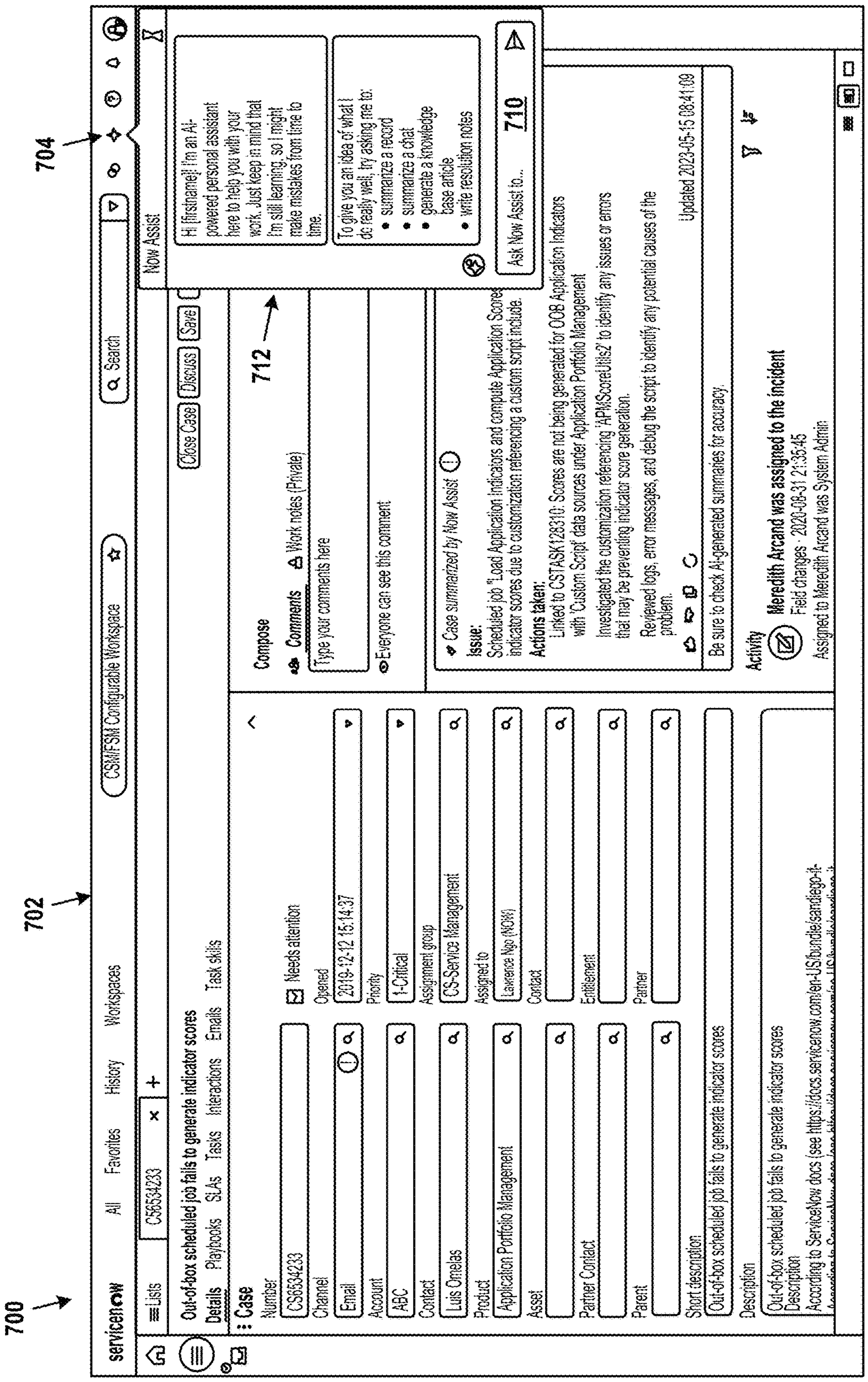
Figure 7C:
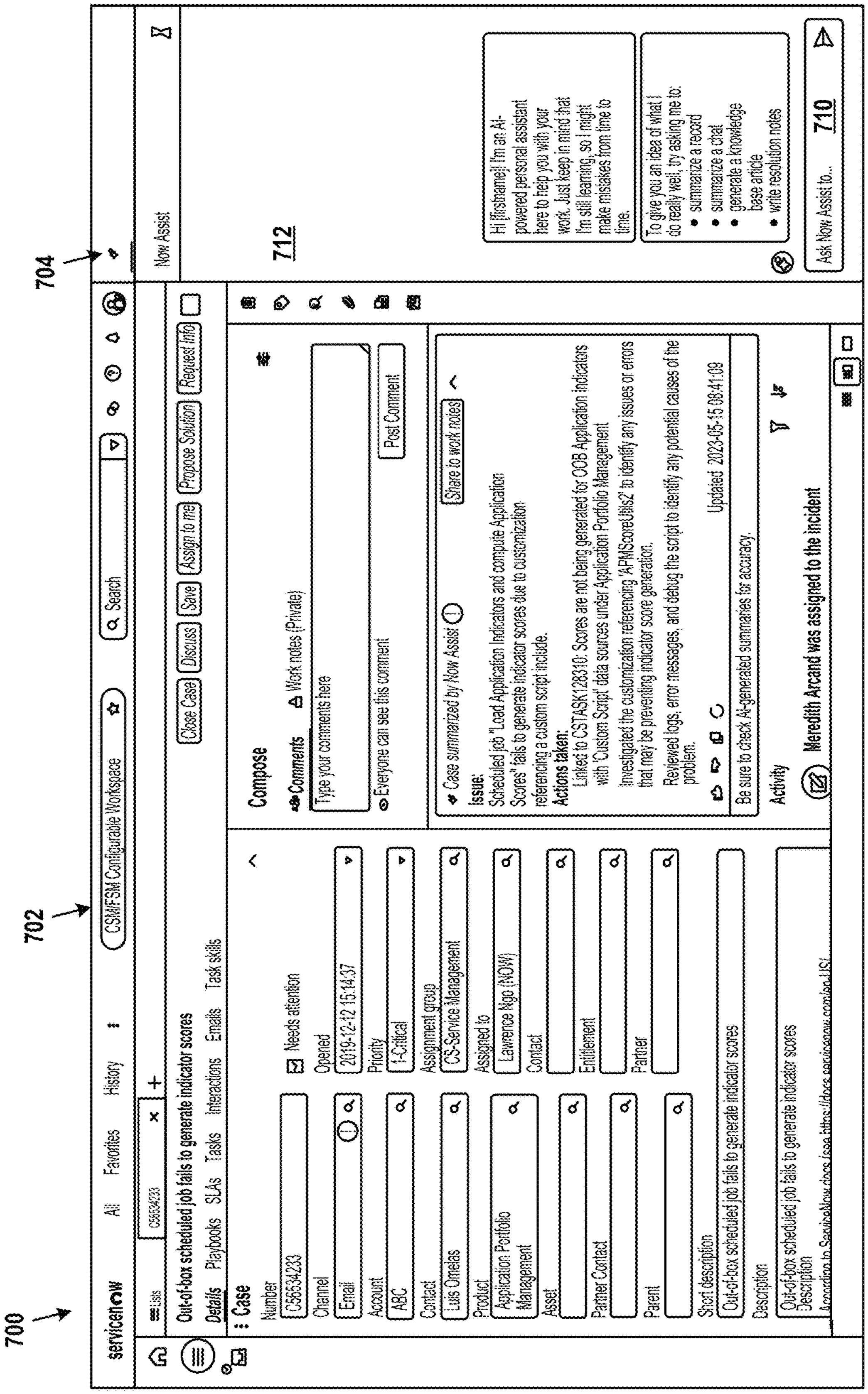
Figure 7D:
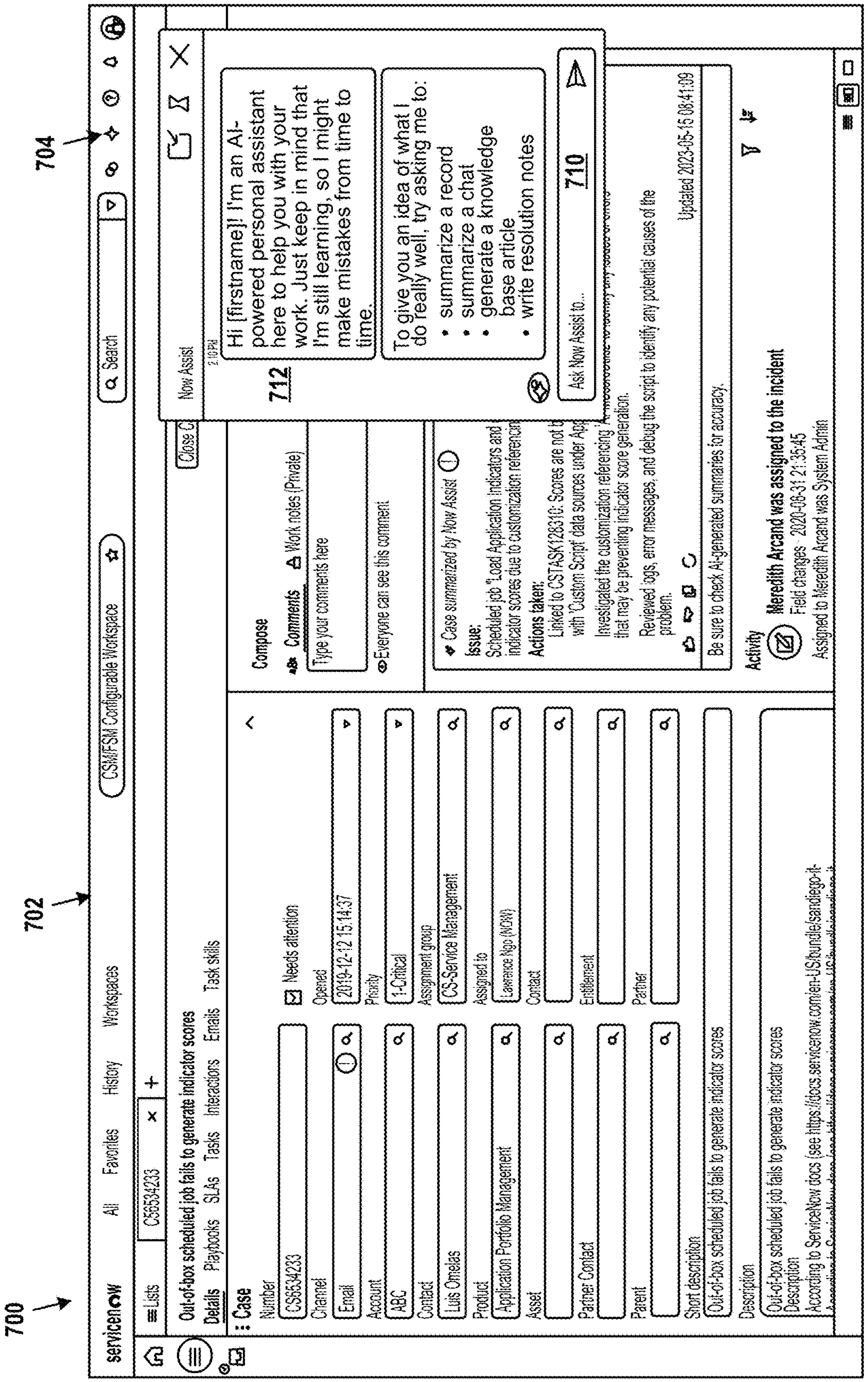

FIG. 7A depicts an application's graphical user interface 700 with a title bar 702 that includes an AI-assist icon 704 (the sparkle-like icon). Actuating this icon can cause a textual LLM chat interface 710 to appear in a popup window 712 (titled "Now Assist"), as shown in FIG. 7B. By way of chat interface 710, a user can interact with an LLM. As shown in FIG. 7C, the popup window 712 can be pinned to the side (or another portion) of the overall graphical user interface 700. Also, as shown in FIG. 7D, the popup window 712 can be moved around the overall graphical user interface 700 in a modeless fashion (e.g., not docked to the edge of the screen or any component on the screen). Not shown is the popup window 712 being docked to another edge of the overall graphical user interface 700, which is also possible. Regardless of location, the popup window 712 and/or the chat interface 710 can persist across multiple applications or user experiences.

FIGS. 8A-8D depict an LLM integration with a specific application. Other applications can be integrated in the same or a similar fashion.

Figure 8A:
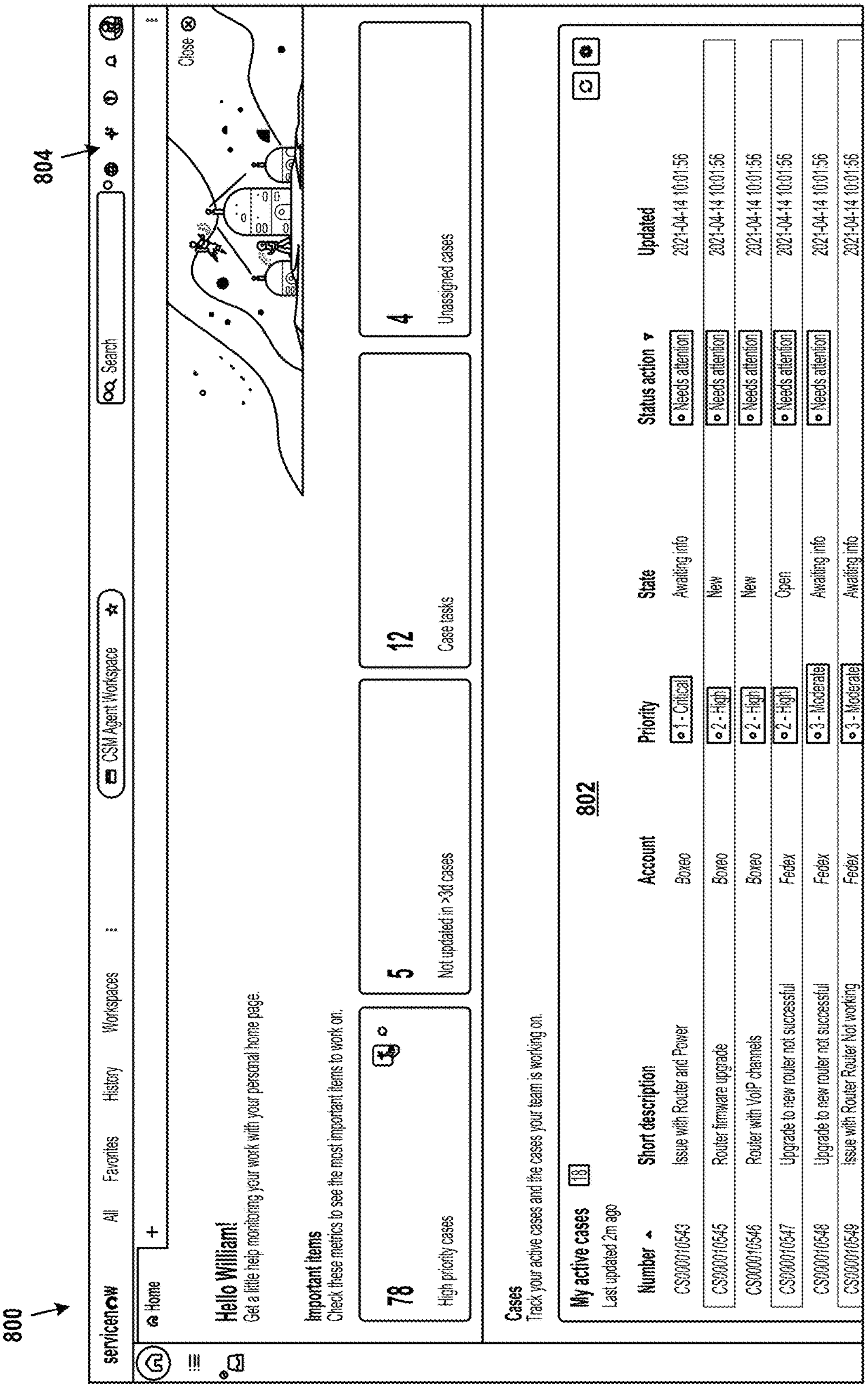
FIGS. 8A, 8B, 8C, and 8D depict an LLM integration with a specific application, in accordance with example embodiments.
Figure 8B:
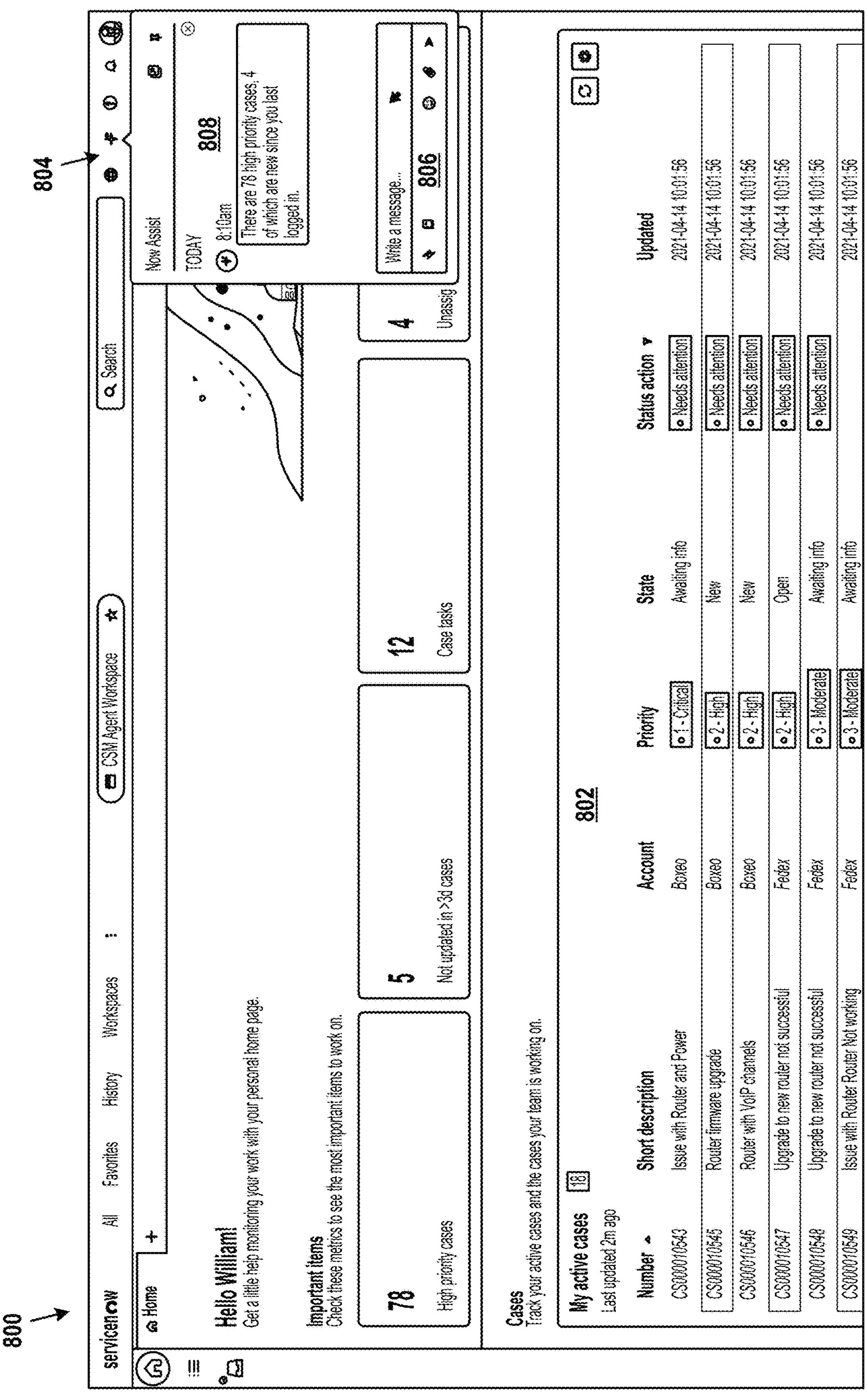
Figure 8C:
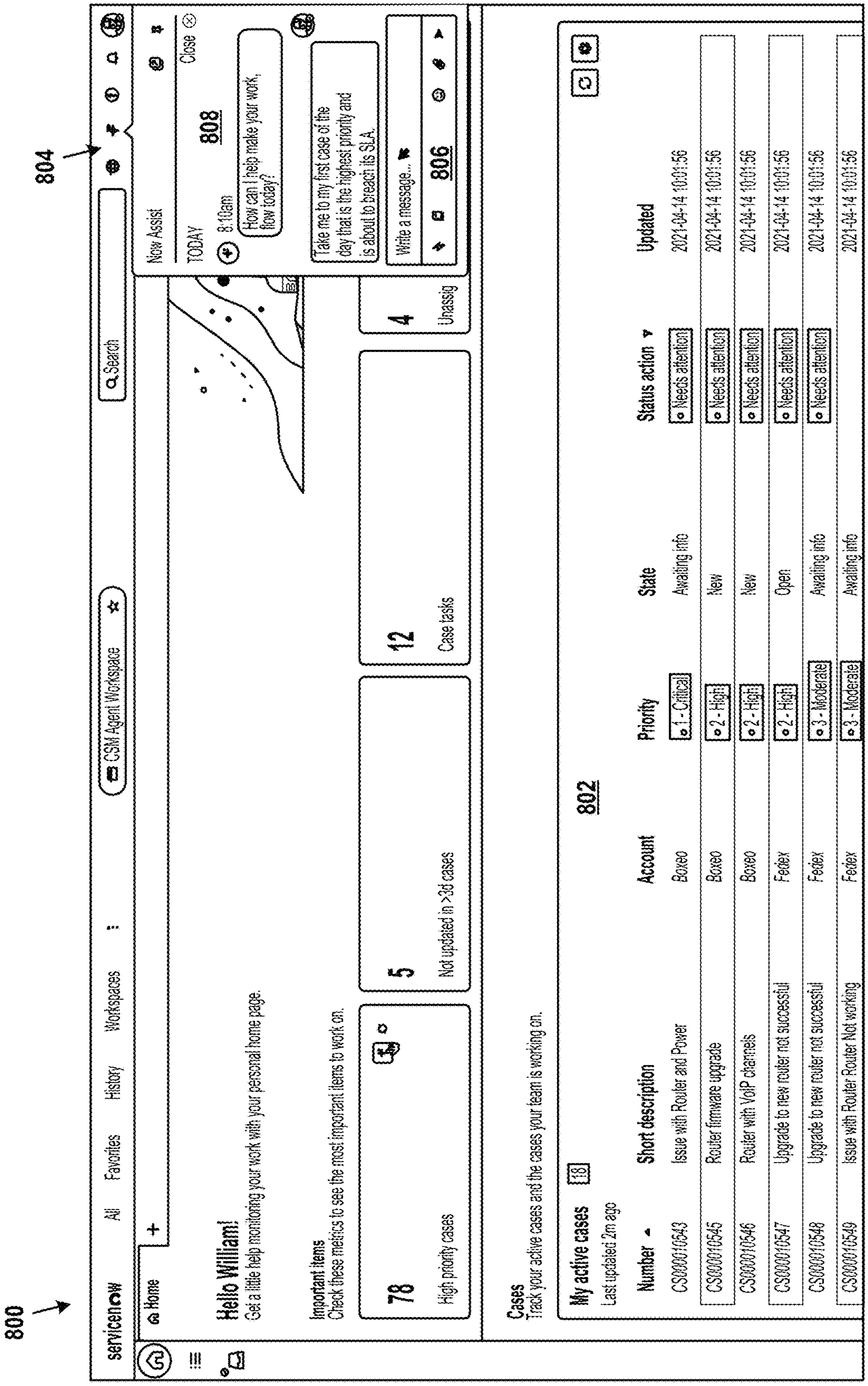
Figure 8D:
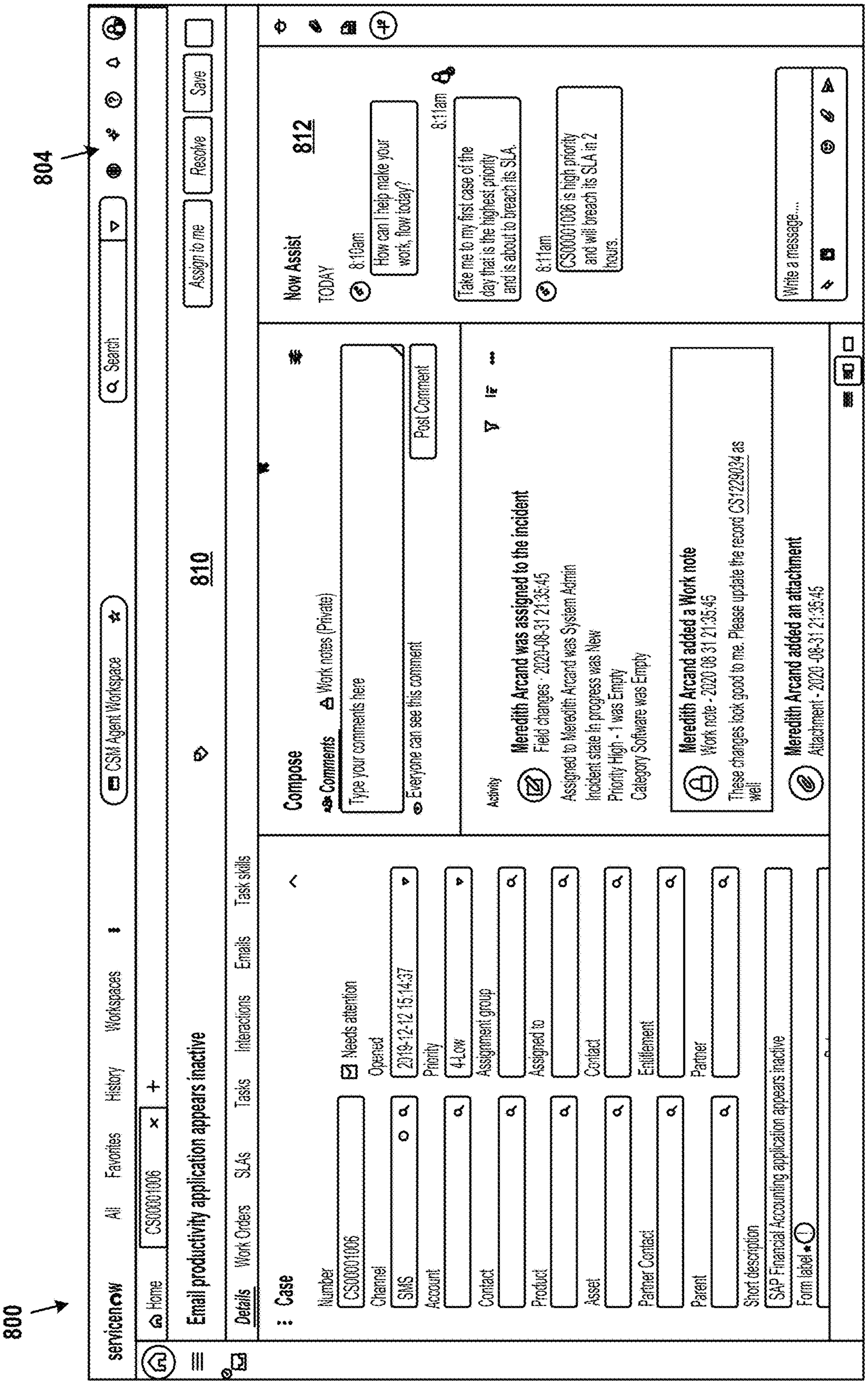

FIG. 8A depicts an application's graphical user interface 800 with a component 802 (a listing of high priority cases) and an AI-assist icon 804 (the sparkle-like icon). Actuating this icon 804 can cause a textual LLM chat interface 806 to appear in a popup window 808 (titled "Now Assist") as shown in FIG. 8B. By way of this chat interface 806, a user can interact with an LLM. Also, since this chat interface 806 is aware of the context in which it was opened (high priority cases), it may automatically display an overview of this user's high priority cases as shown. FIG. 8C depicts a user providing input to the chat interface 806 asking for their first case of the day that is highest priority and about to breach its service-level agreement (SLA). FIG. 8D depicts a response from the LLM which causes the graphical user interface 800 to change state and show the requested case 810 with a pinned LLM chat interface 812.

B. Integration with a User Interface Builder

FIGS. 9A-9H depict an LLM integration with user interface builder tools. Various types of user interfaces can be developed in a no-code fashion using these integrated tools.

Figure 9A:
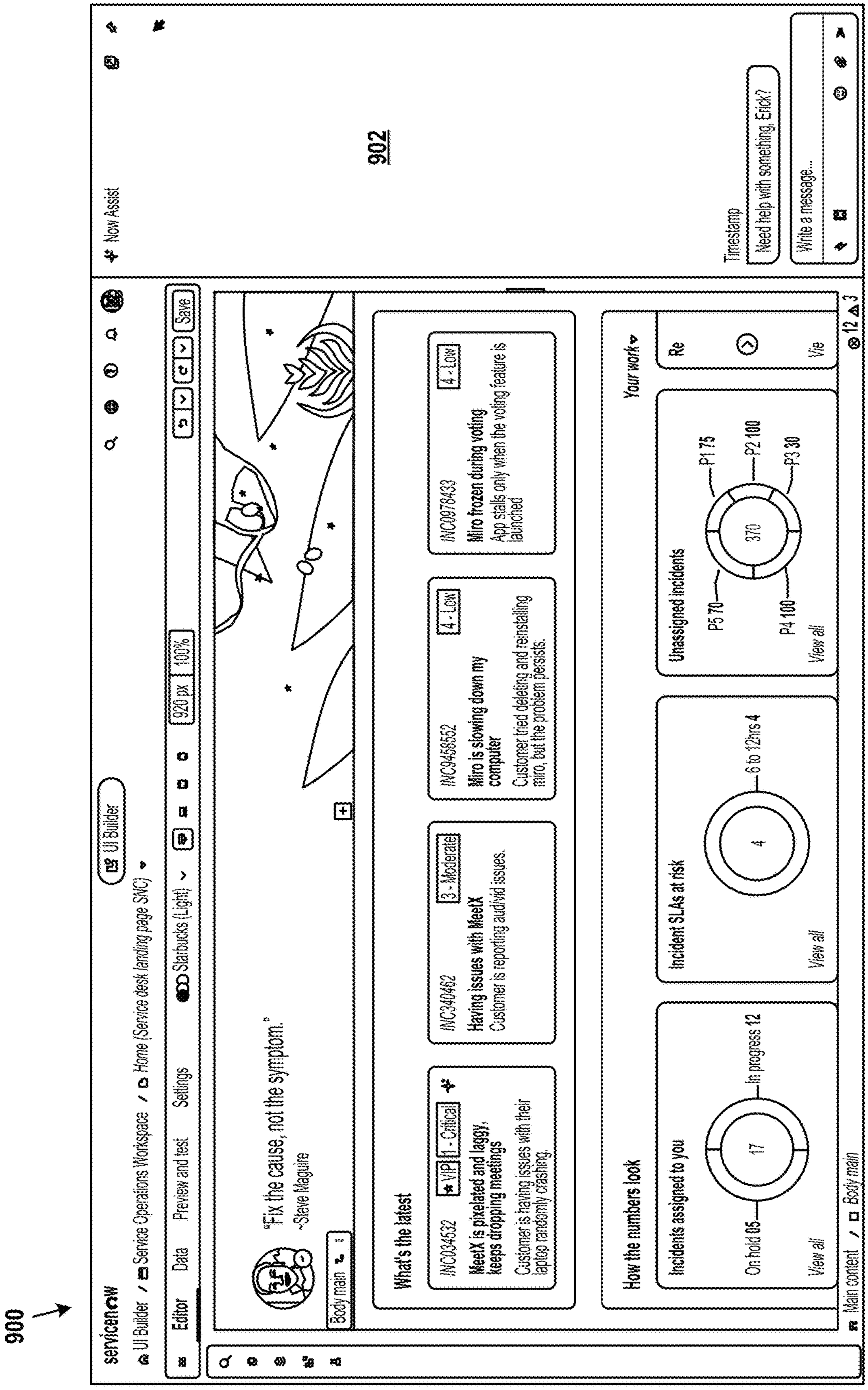
FIGS. 9A, 9B, 9C, 9D, 9E, 9F, 9G, and 9H depict an LLM integration with user interface builder tools, in accordance with example embodiments.
Figure 9B:
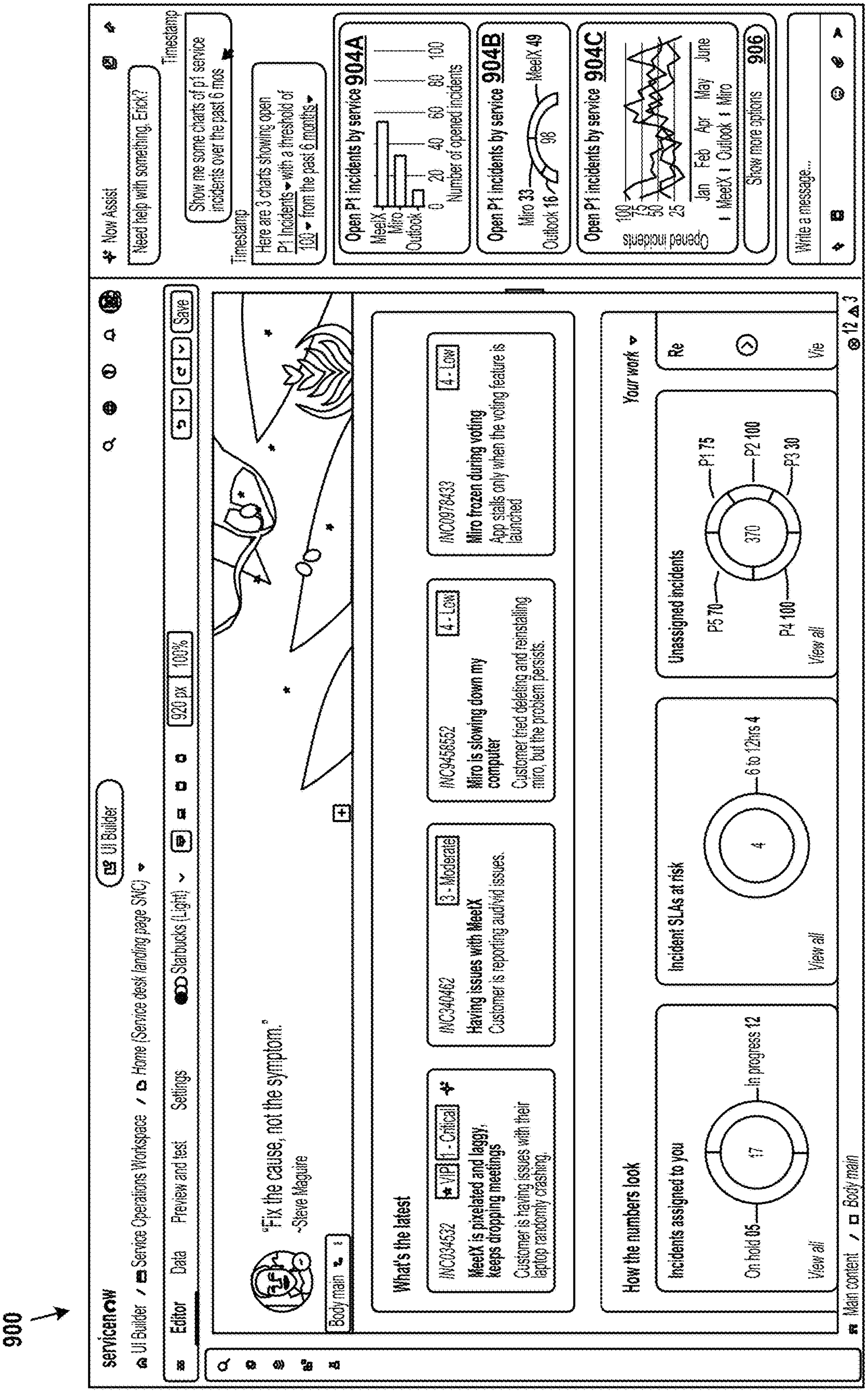
Figure 9C:
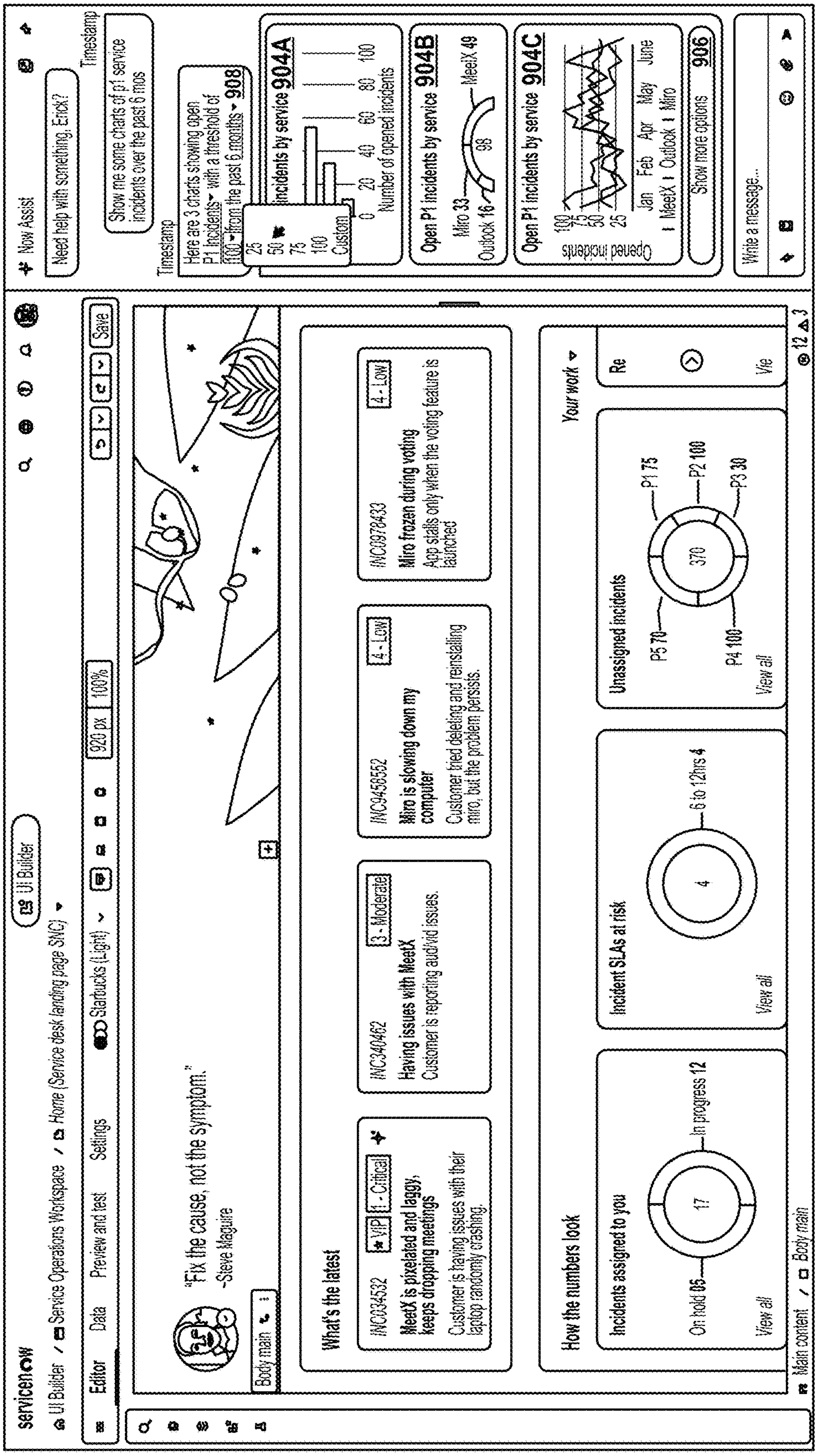
Figure 9D:
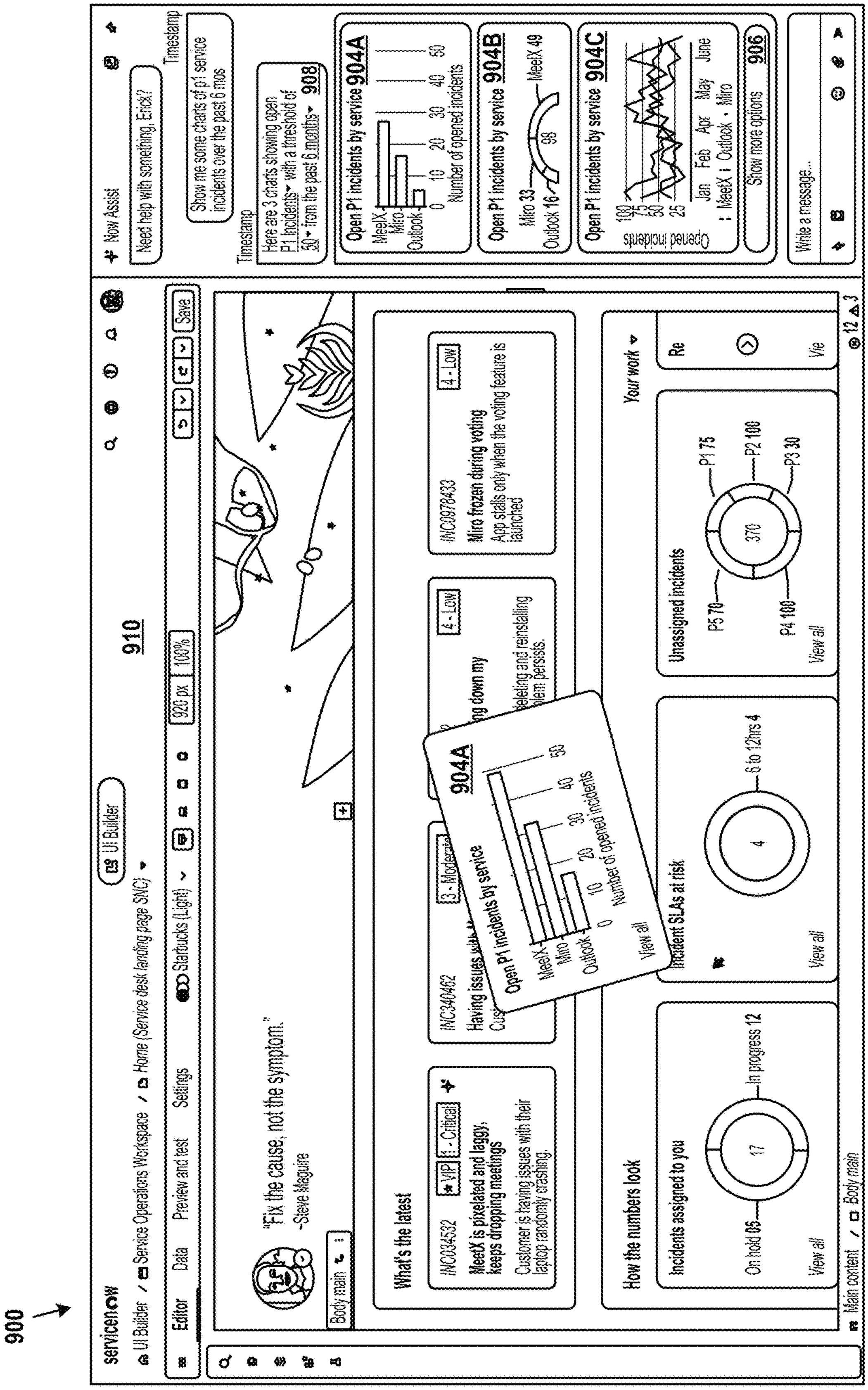
Figure 9E:
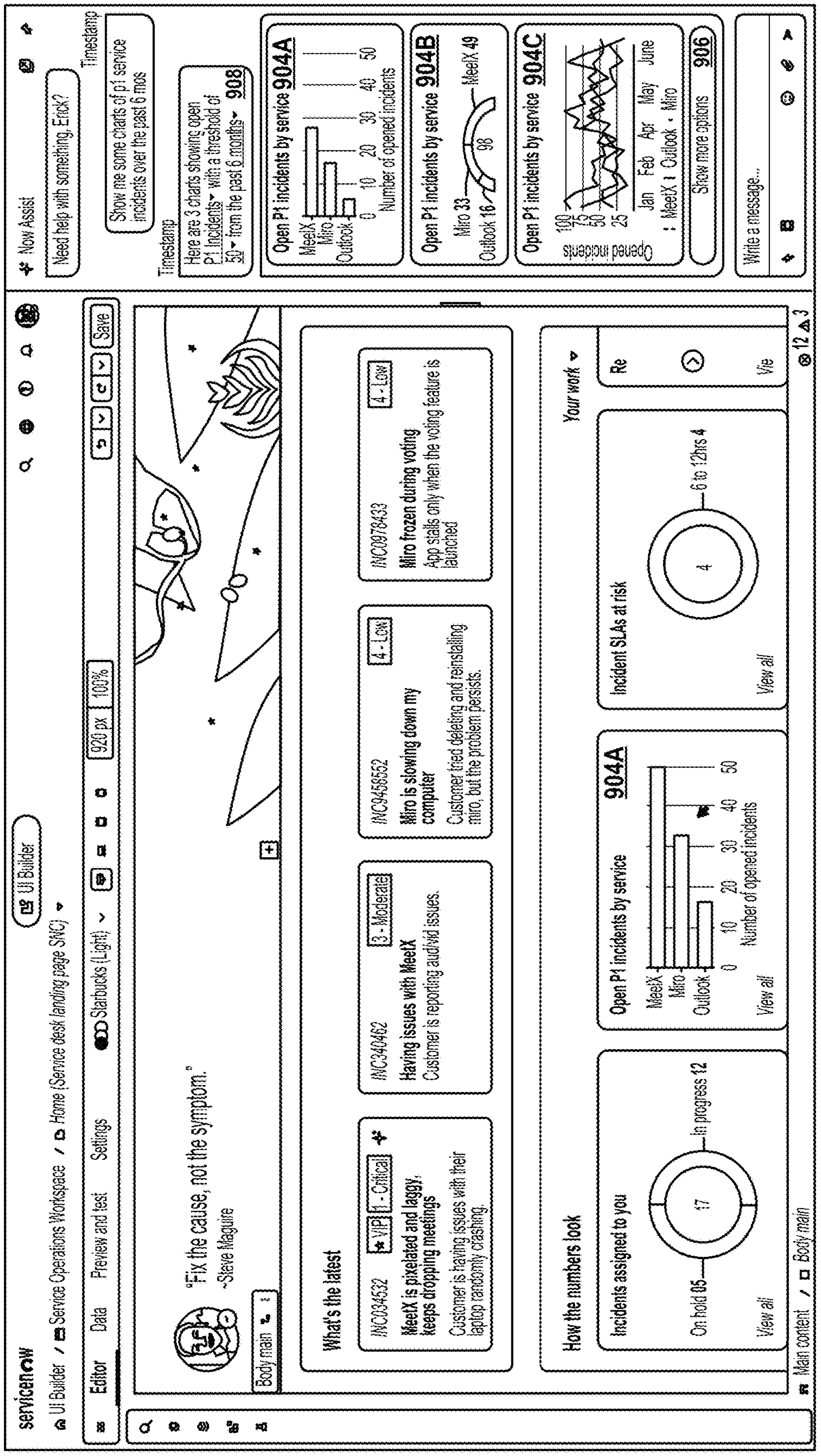

FIG. 9A depicts a user interface builder 900, with a chat interface 902 pinned to the right side. FIG. 9B depicts the result of the user asking the chat interface 902 to show charts of P1 service incidents over the last 6 months. The platform (with help from the LLM) generates three possible charts 904A, 904B, 904C, with a button 906 to generate additional options. As shown in FIG. 9C, the response 908 from the chat interface is parameterized so that the user can have it modify the charts dynamically (e.g., by changing the threshold as shown). Also, as shown in FIGS. 9D and 9E, any of the charts (e.g., chart 904A as shown) can be dragged and dropped into the user interface 910 that is being built.

Figure 9F:
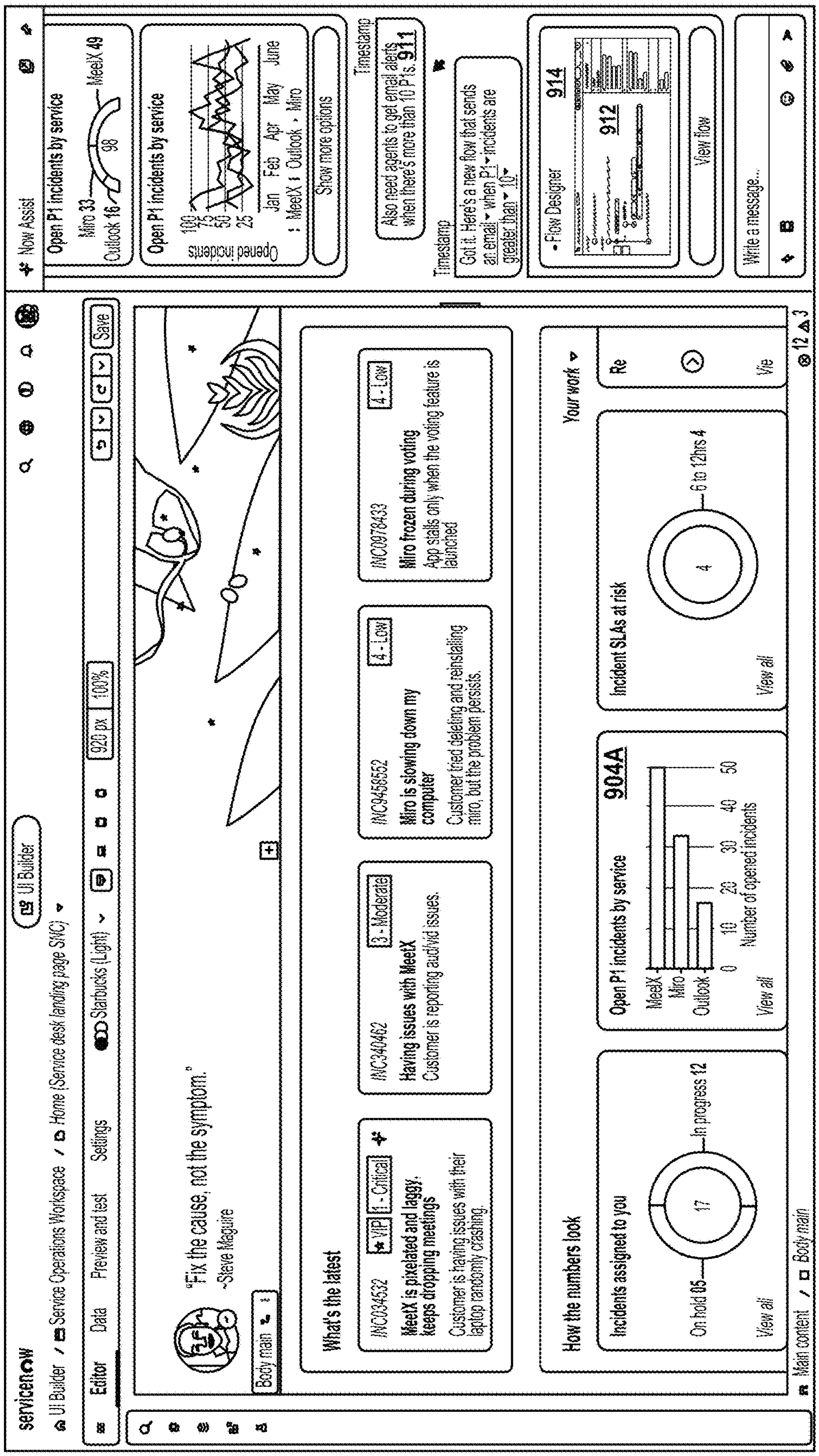
Figure 9G:
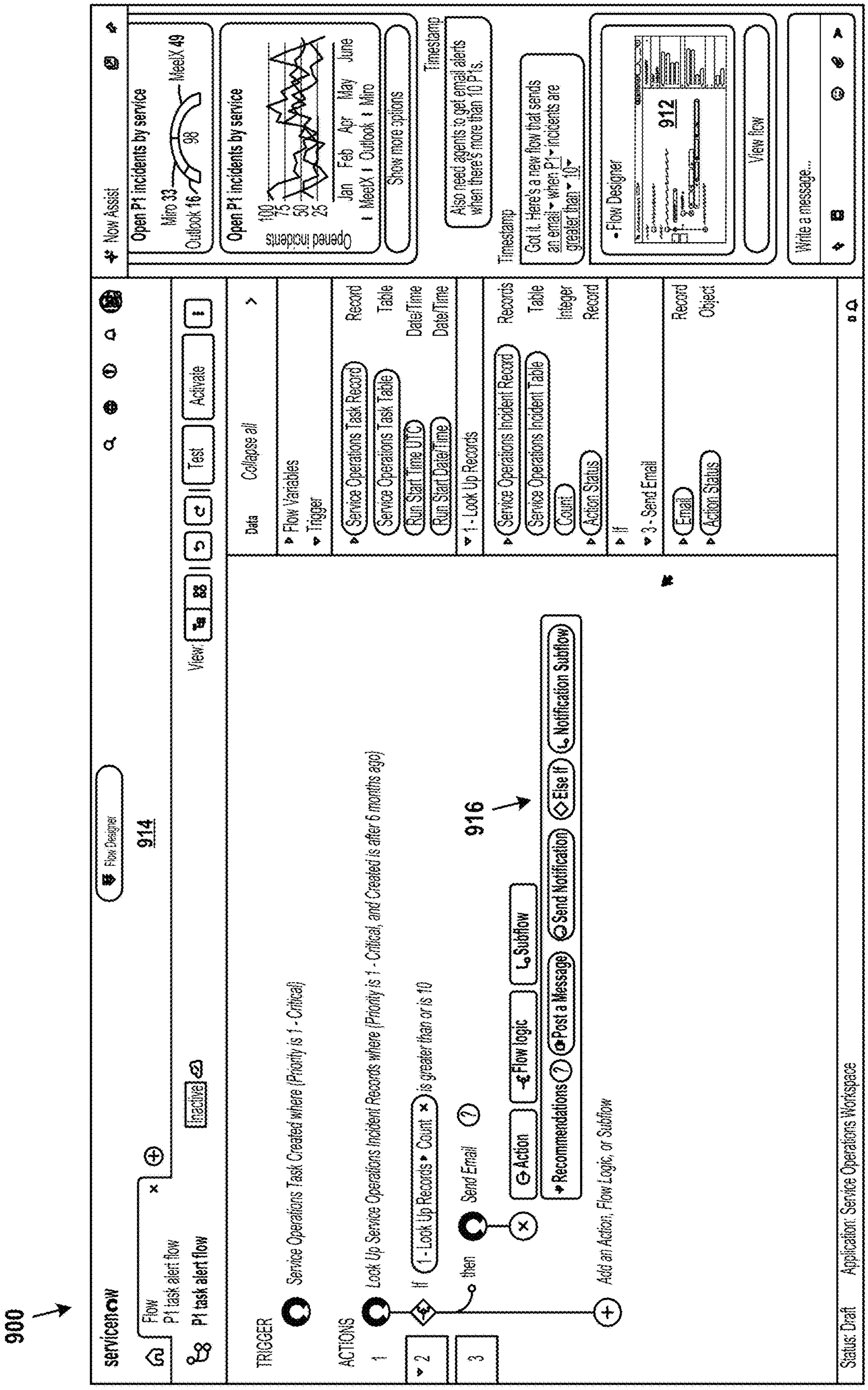
Figure 9H:
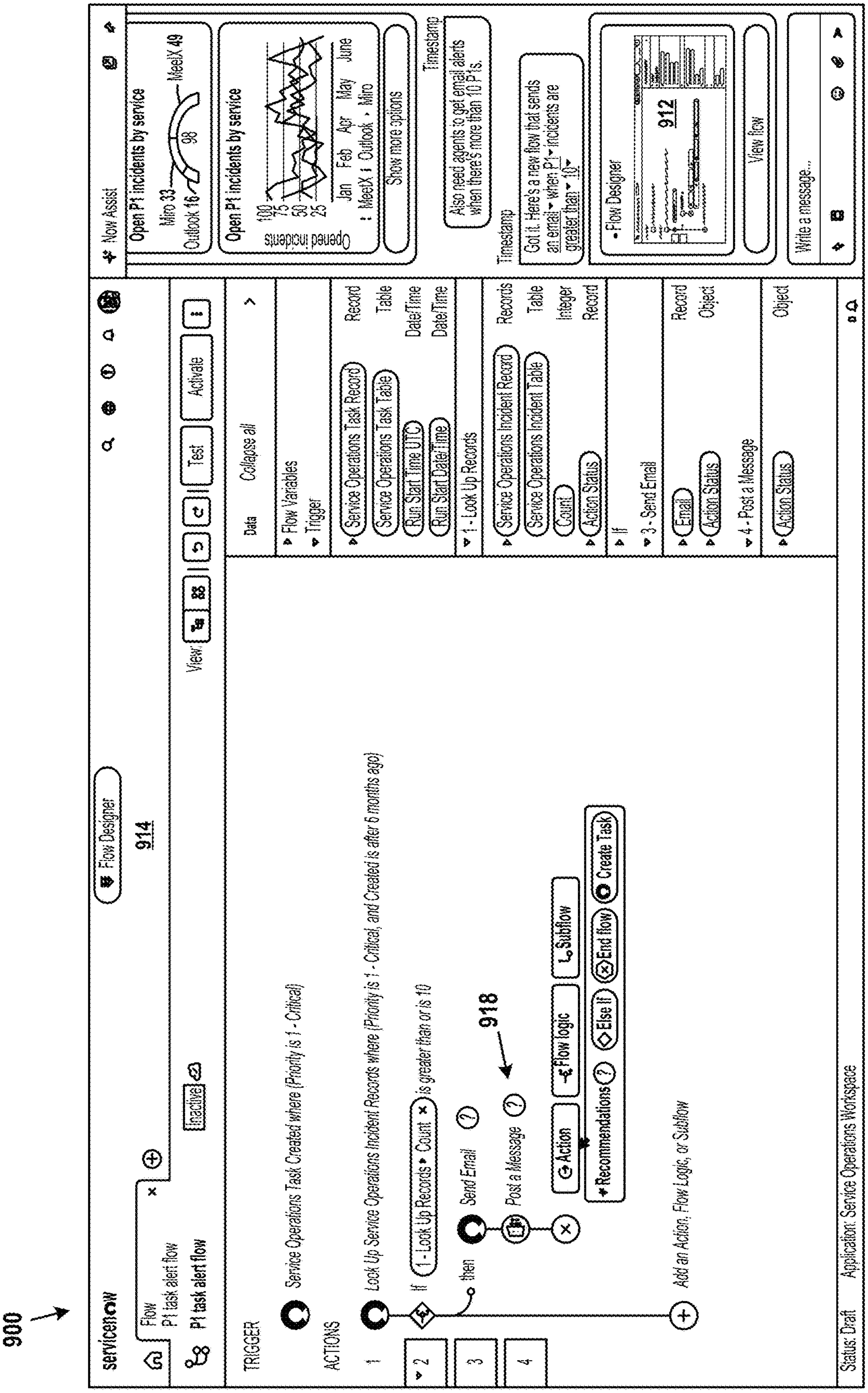

FIG. 9F depicts the user requesting 911, via the chat interface 902, a way for agents to receive email alerts when there are more than 10 P1 incidents. In response, the platform (with help from the LLM) generates a workflow 912 for the flow designer application 914. As depicted in FIG. 9G, the user can select the generated workflow 912 and cause it to open in the flow designer application 914. As part of the generated workflow 912, the system has made a selectable suggestion (on a recommendations bar 916) that the agent should perhaps receive some other form of notification in addition to an email. As shown in FIG. 9H, the user has selected that a message 918 is also to be sent via a collaboration platform.

C. Integration with an Incident Management Application

As an example of LLM integration with a task-based application, FIGS. 10A-10J depict LLM integration with an incident management application. Nonetheless, LLM integration can take place with other types of task-based applications in the same or a similar fashion.

Figure 10A:
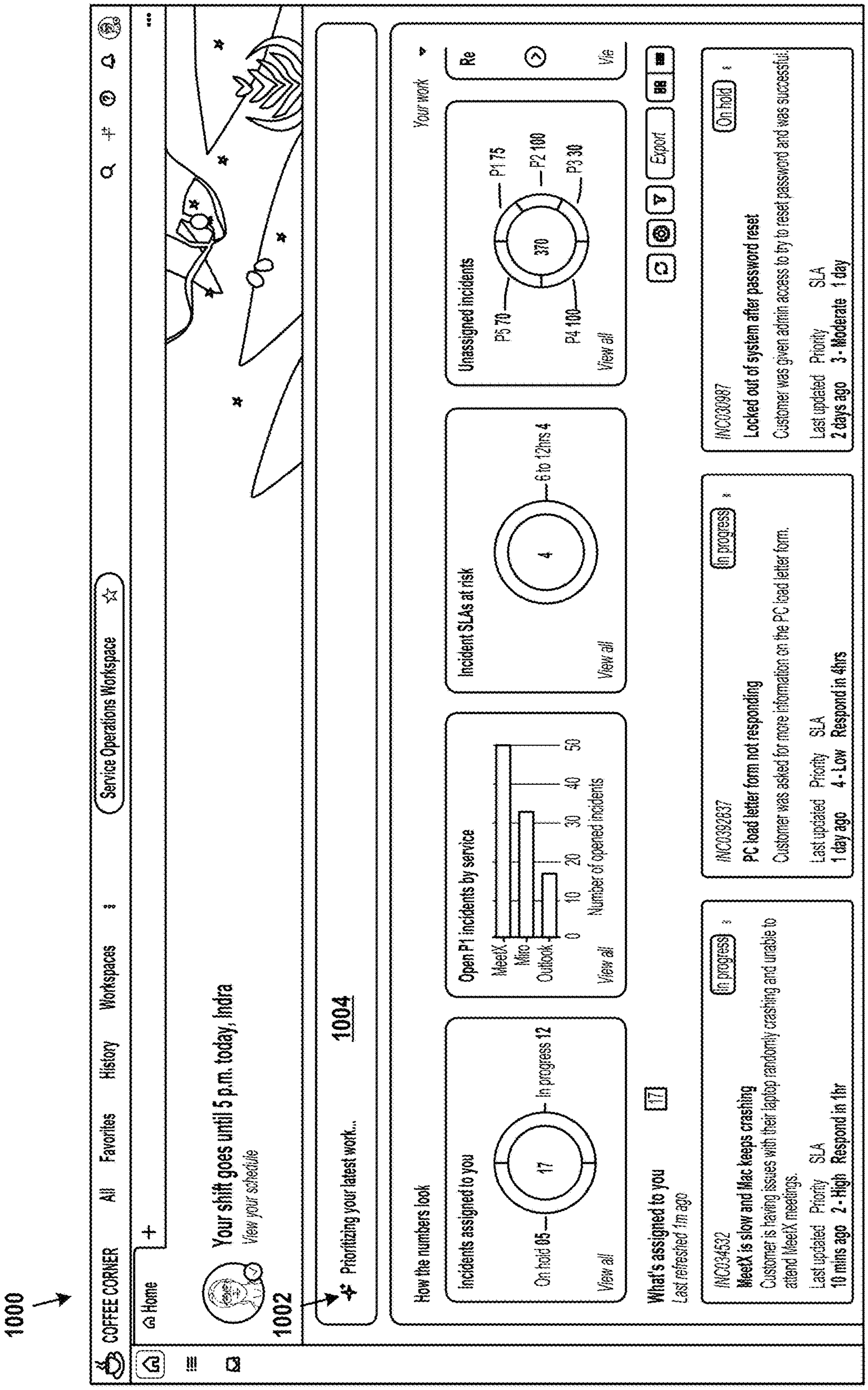
FIGS. 10A, 10B, 10C, 10D, 10E, 10F, 10G, 10H, 10I, and 10J depict an LLM integration with an incident management application, in accordance with example embodiments.
Figure 10B:
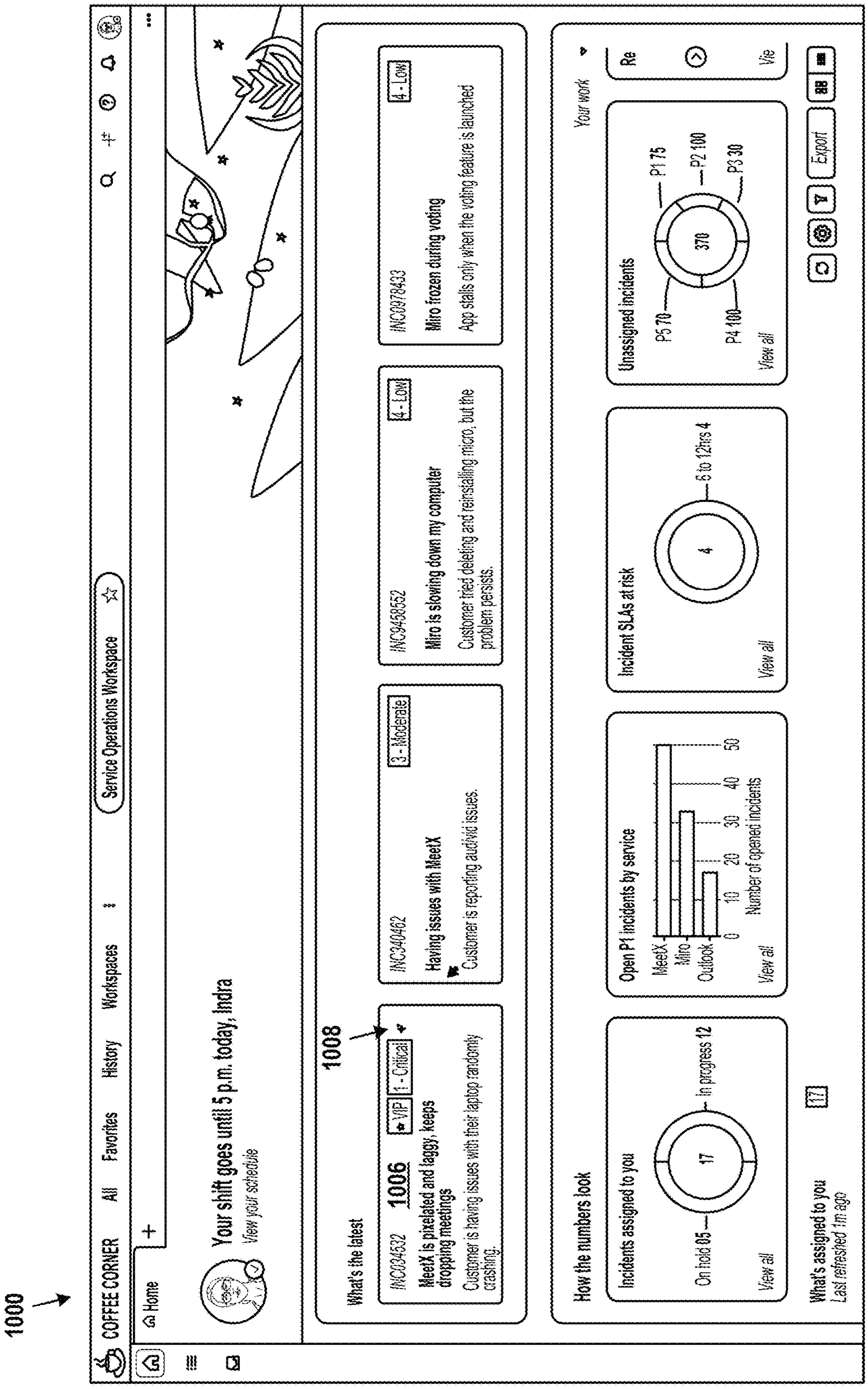
Figure 10C:
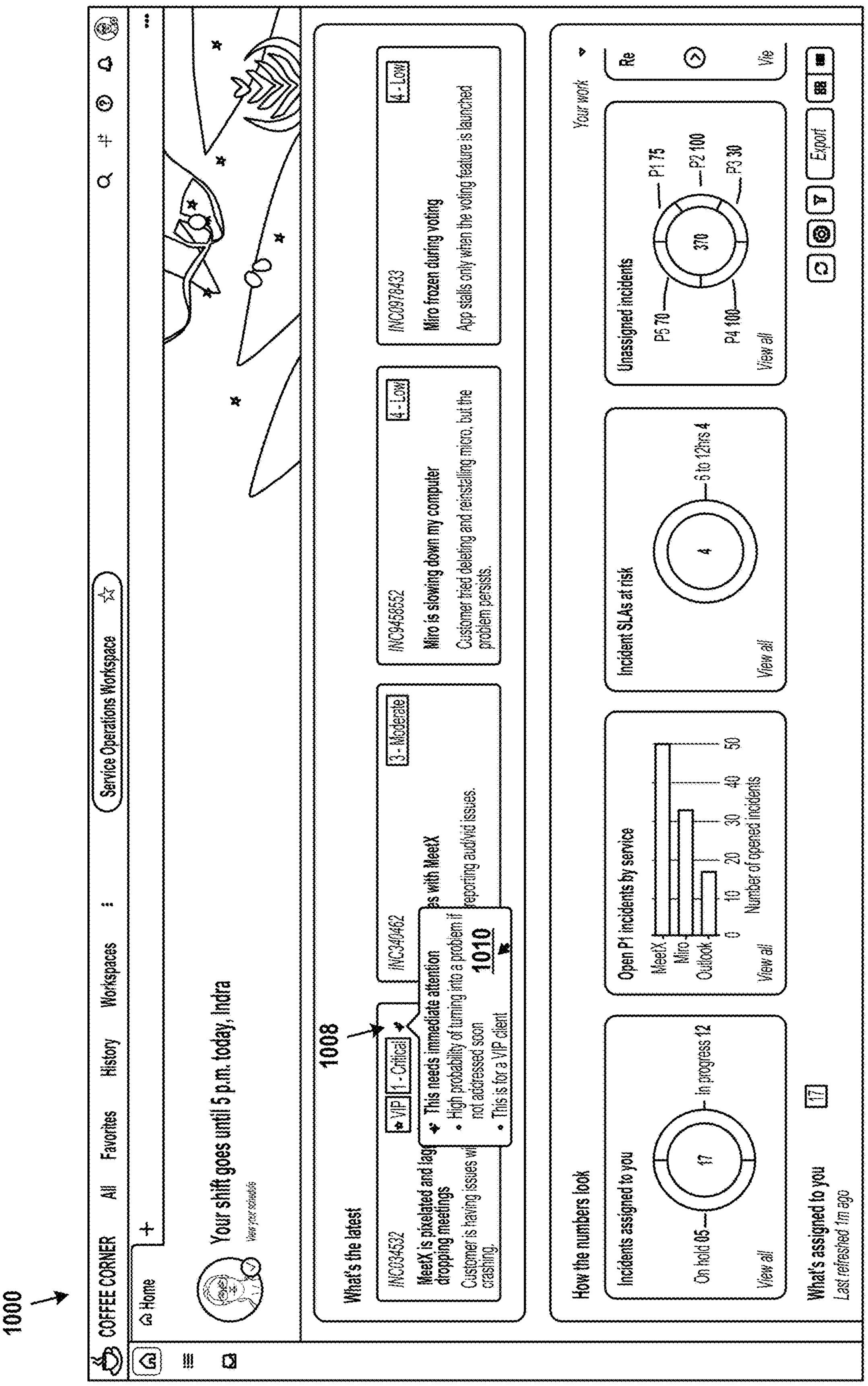

FIG. 10A depicts an incident portal web page 1000 for a human agent tasked with resolving incidents. The AI-assist icon 1002 (the sparkle-like icon) here shows an interstitial message 1004 indicating that the system (with possible LLM assistance) is gathering a prioritized list of tasks for the agent. FIG. 10B depicts the portal web page 1000 with the prioritized list filled out. Notably, incident INC034532 1006 displays the AI-assist icon 1008, indicating that the system (with possible LLM assistance) has more information for the agent relating to this incident. FIG. 10C depicts a display 1010 of this information in response to the agent actuating this AI-assist icon 1008. Accordingly, the system (with possible LLM assistance) indicates in display 1010 that the incident needs immediate attention because it could be a symptom of a widespread problem and that the user is a VIP.

Figure 10D:
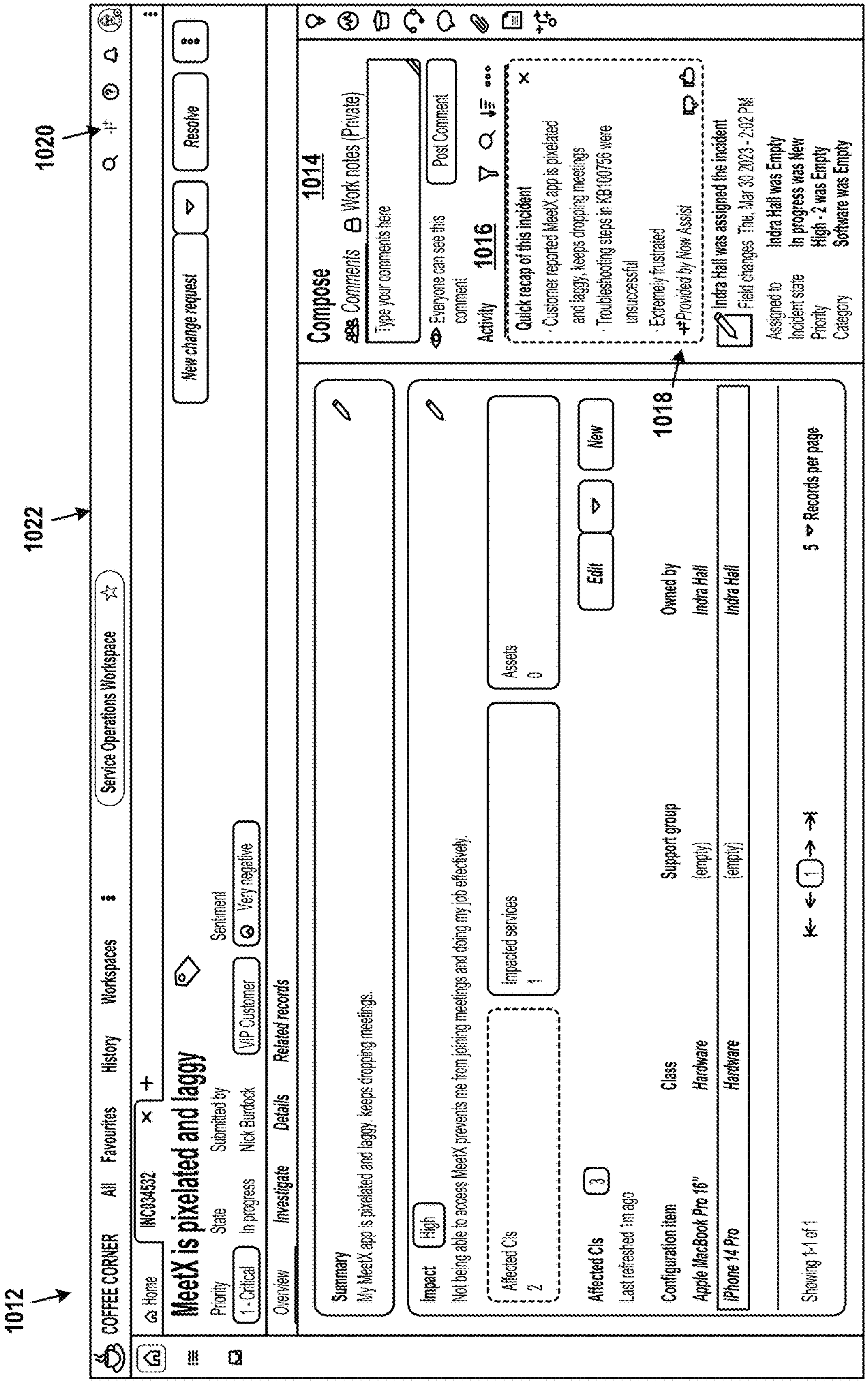

FIG. 10D depicts a web page 1012 displaying this incident in detail. The right side 1014 of the web page 1012 includes an activity section 1016 that includes a quick recap of the incident that was generated by AI assist (and indicated by the sparkle-like icon 1018). It provides context about the incident, the user, and what the user has tried to do in order to resolve the incident but which so far has failed. A summary of any interaction between the user and a virtual agent may be included. Also, like other pages, this web page 1012 has the contextual AI assist icon 1020 on its title bar 1022.

Figure 10E:
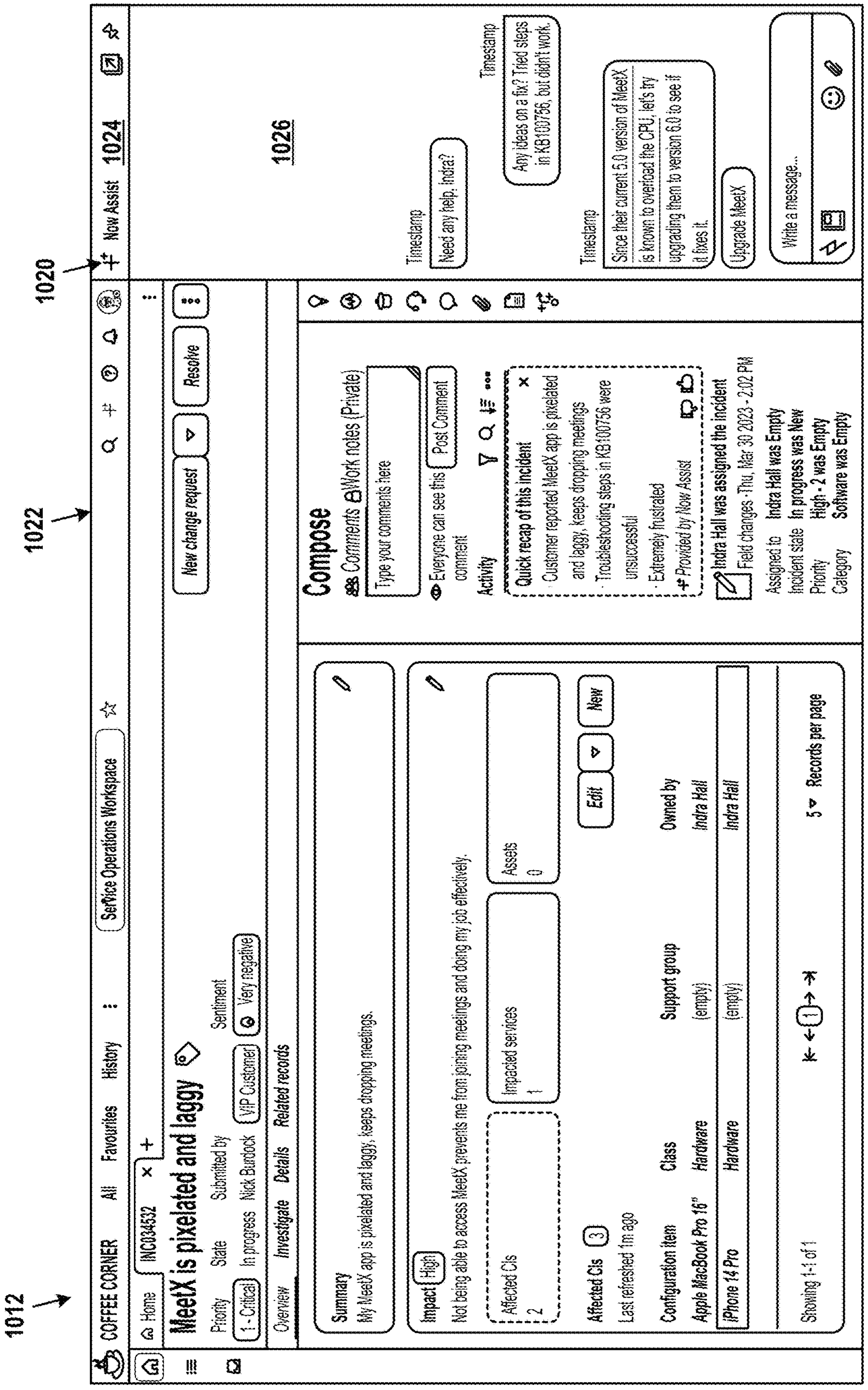

FIG. 10E depicts the web page 1012 after the agent has actuated the AI assist icon 1020 on the title bar 1022 and pinned the resulting popup window 1024. In the chat interface 1026 the agent asks for suggestions. The system (with possible LLM assistance) suggests pushing a software upgrade of a videoconference application to the user's computer. This suggestion may have been found in the documentation or release notes of the videoconference application, user history, and/or similar incidents, and then summarized by the LLM.

Figure 10F:
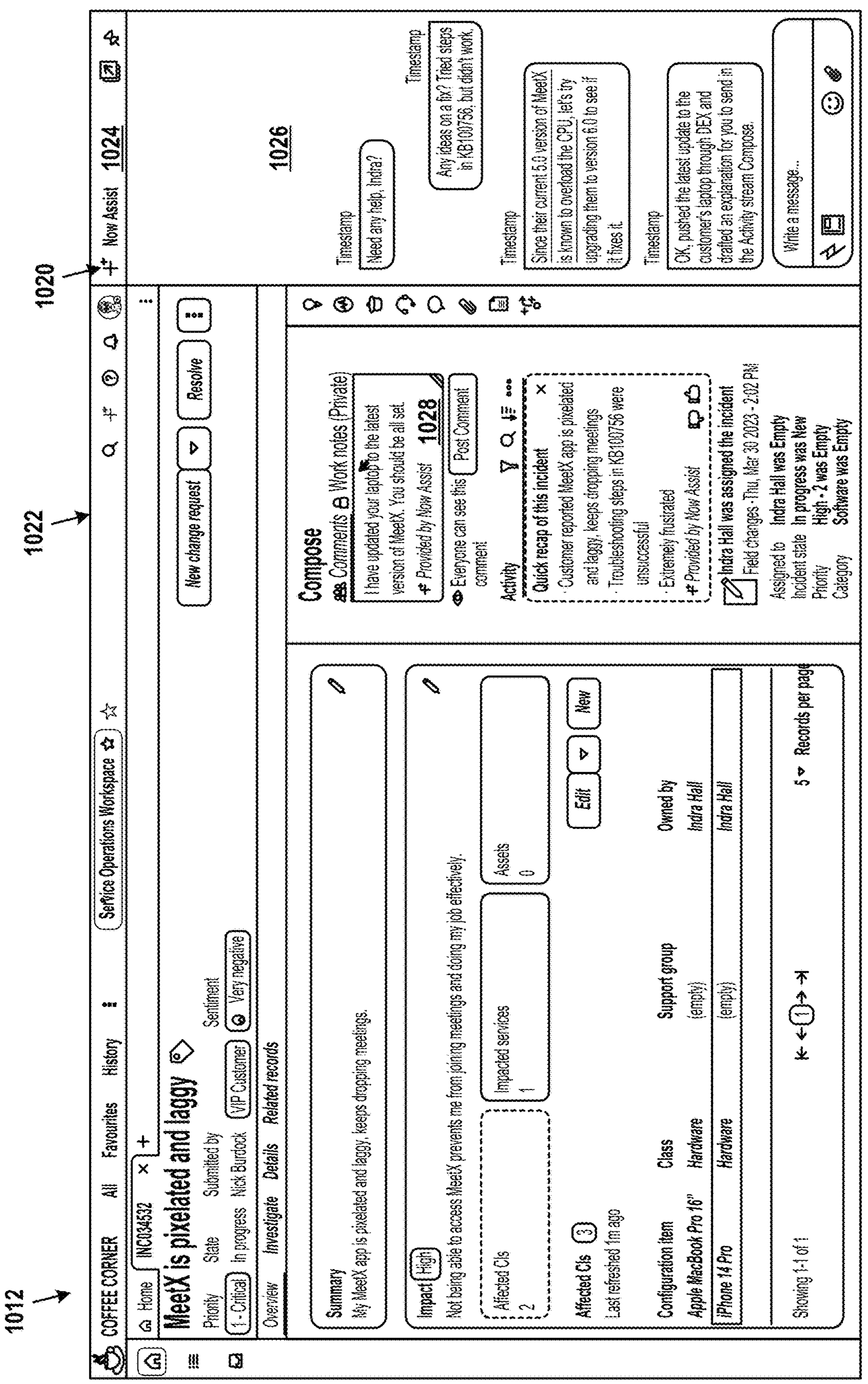
Figure 10G:
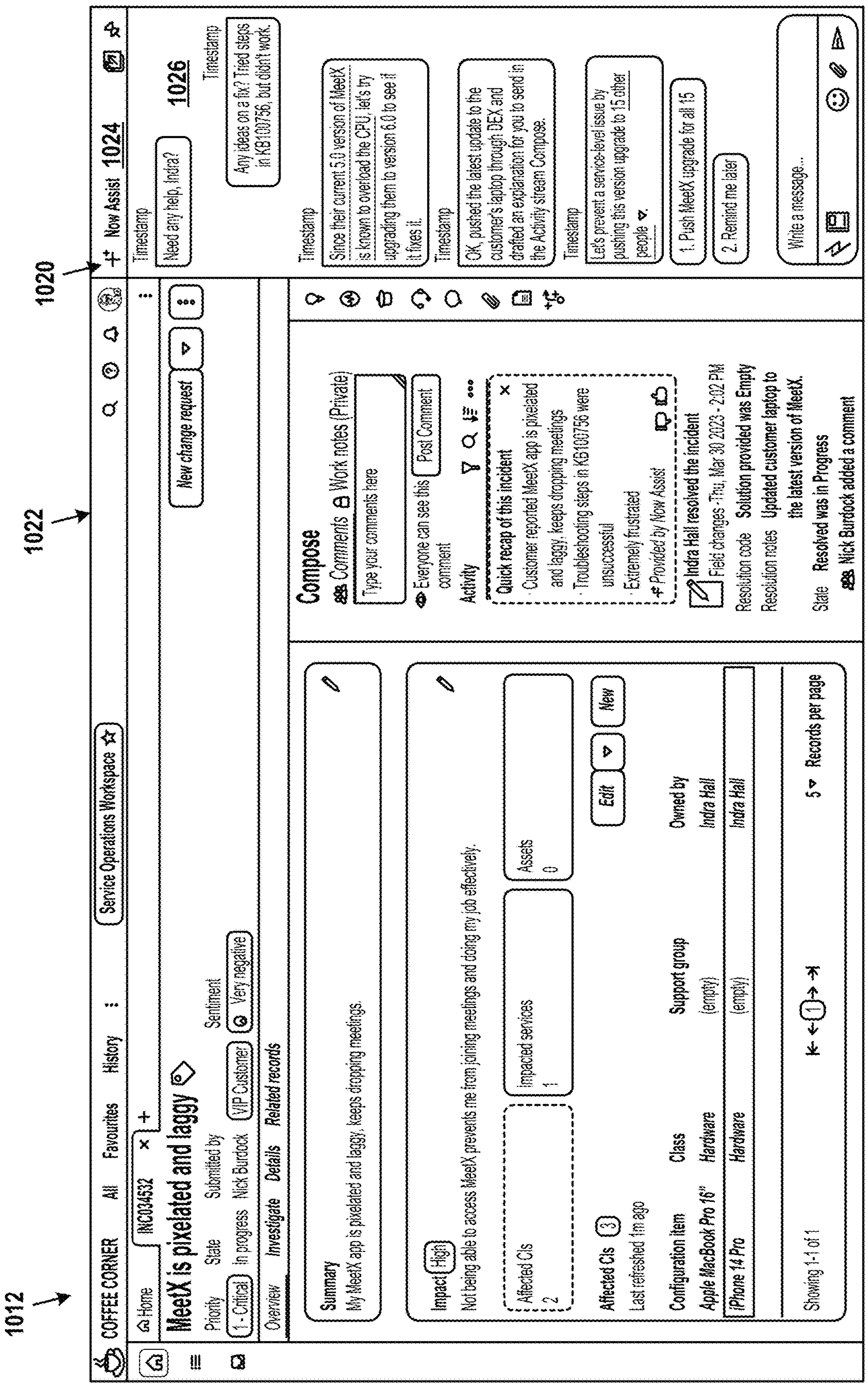

FIG. 10F depicts the web page 1012 after the agent agrees to push the software upgrade. The system (with possible LLM assistance) indicates in the chat interface 1026 that this has happened and automatically composes a comment 1028 to be added to the incident, where the comment 1028 specifies the resolution. FIG. 10G depicts the web page 1012 after the agent agrees to post the comment 1028 to the incident. In the chat interface 1026, the system (with possible LLM assistance) notes that there are 15 other users with the older version of the videoconference application and suggests upgrading their computers as well. Though not shown, there is a drop-down menu associated with the text "15 other people" that can be used to select only a subset of these users to upgrade.

Figure 10H:
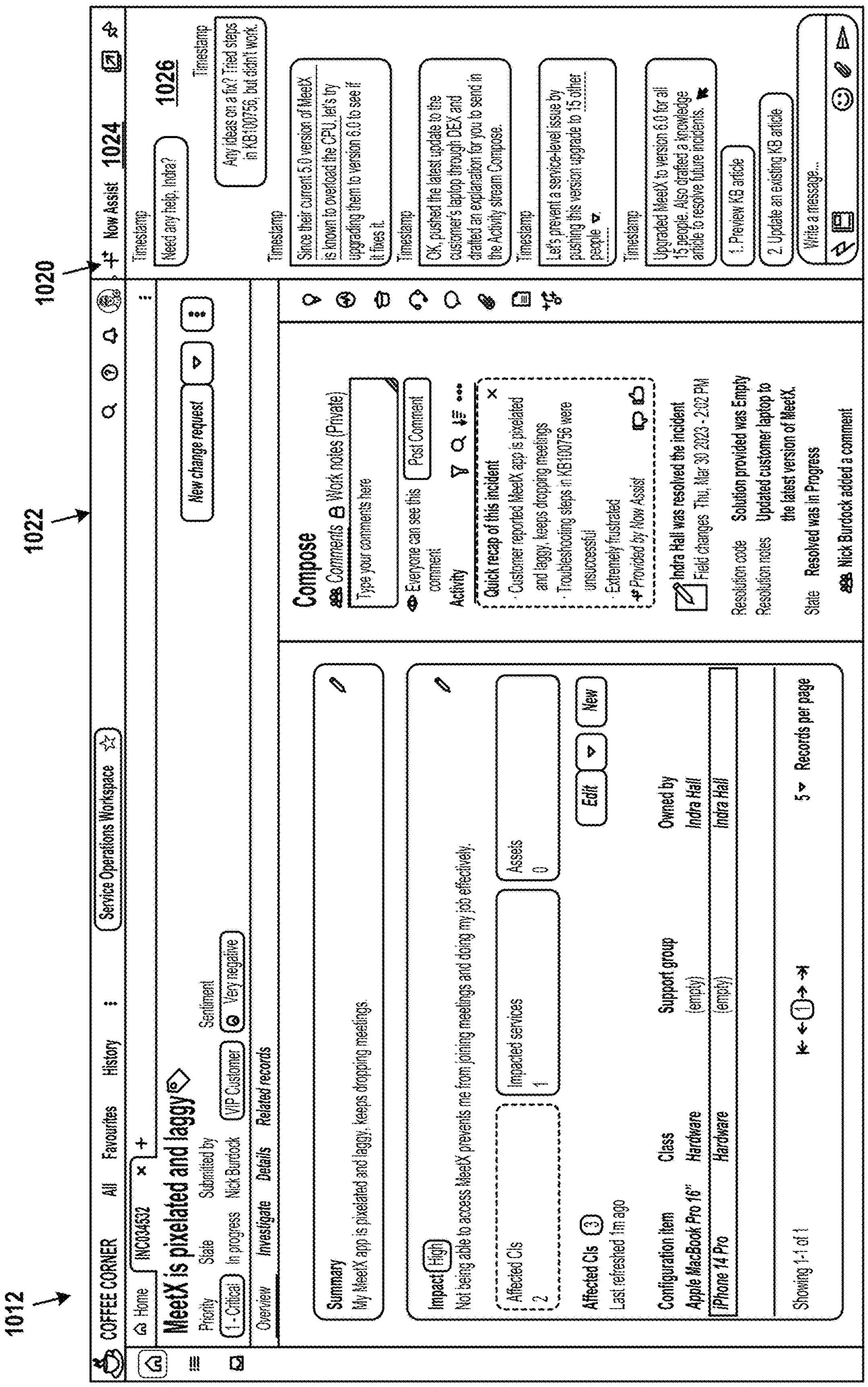
Figure 10I:
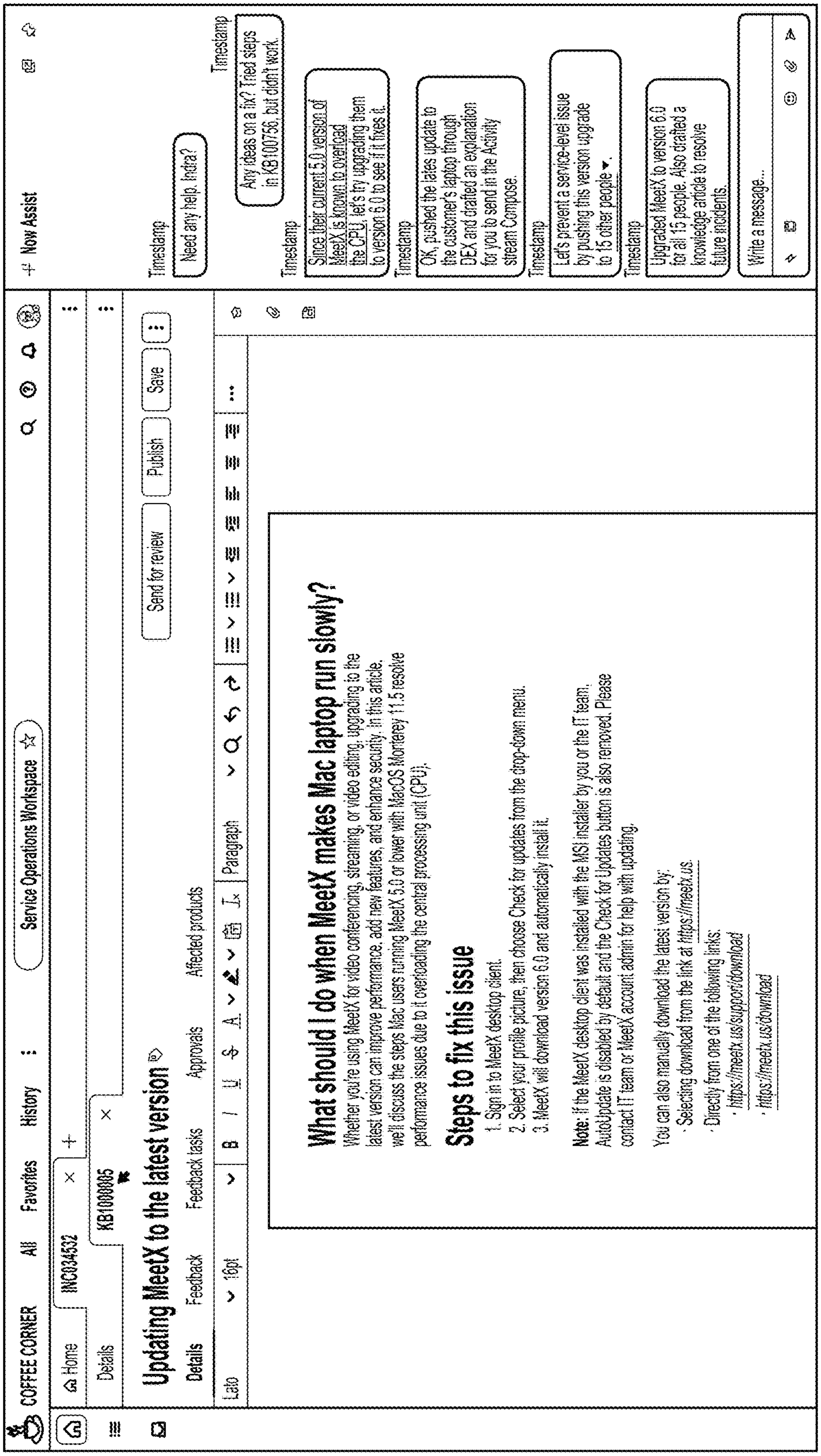
Figure 10J:
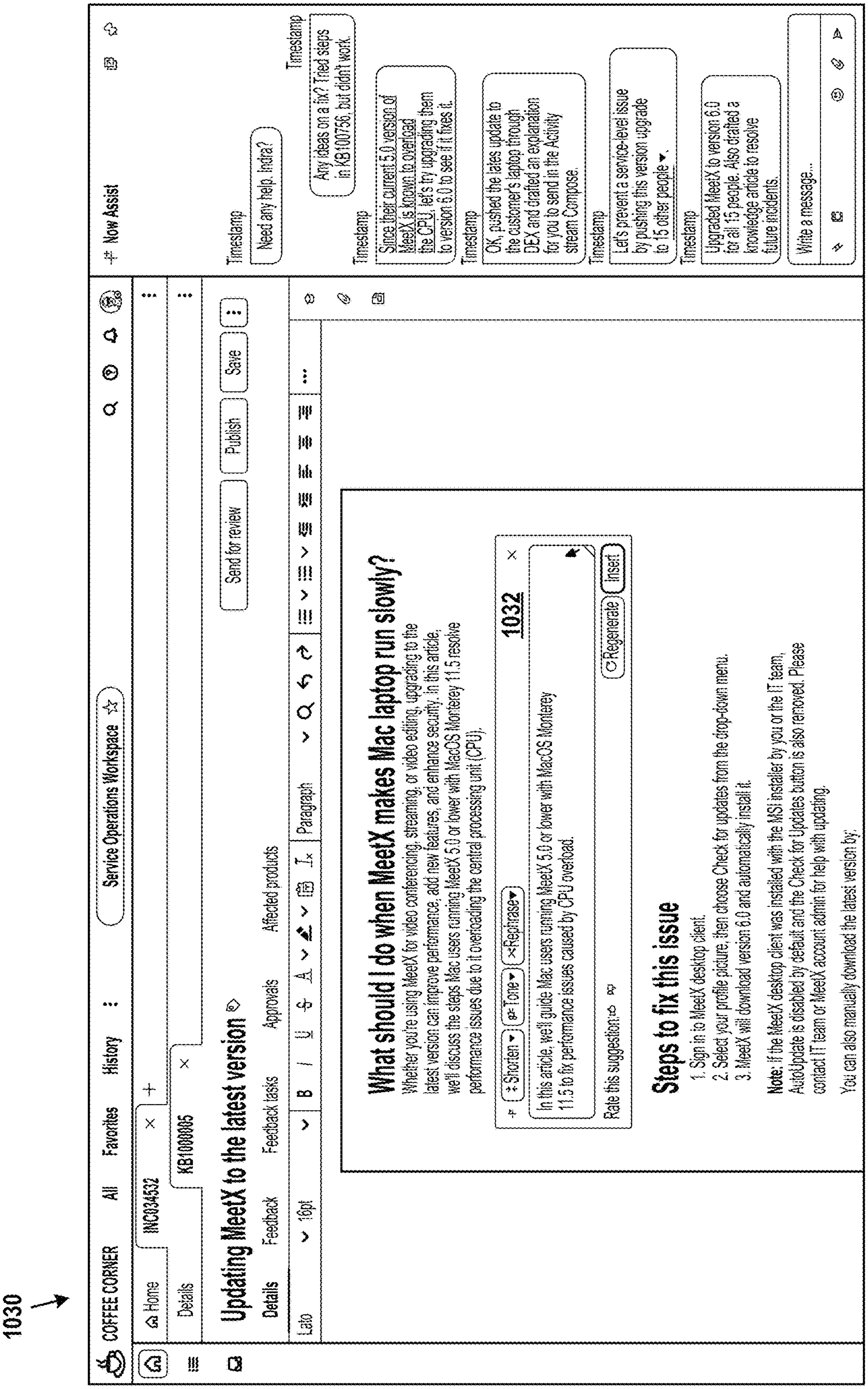

FIG. 10H depicts the web page 1012 after the agent agrees to push the software upgrade to the other users. The chat interface 1026 gives the agent an option to preview a new knowledgebase article explaining the problem that caused the incident as well as its resolution. FIG. 10I depicts a knowledgebase drafting web page 1030 that is displayed in response to the user actuating the option to preview the knowledgebase article. Notably, this article may be written by the system (with possible LLM assistance) from information in the incident and documentation or release notes of the videoconference application as well as user history and/or similar incidents. As shown in FIG. 10J, this web page 1030 has an AI-assist option 1032 that is invoked when the user highlights a section of the article's text. This option can shorten the text, change its tone, or rephrase it. In FIG. 10J, the agent has asked the AI-assist to shorten the text.

Notably, similar types of AI-assist interfaces and/or user interface flows may be available to users (for self-service such as pushing software upgrades to their computers) and processor managers (for identifying common problems or performance issues across services). In the case of process managers, the system (with possible LLM assistance) may identify possible bottlenecks in a workflow where items are getting stuck for longer periods of time than expected or cycling between states.

D. Integration with a Mobile Application

FIGS. 11A, 11B, 11C, 11D, 11E, and 11F depict an LLM integration with a mobile self-service user interface. These figures and this section establish that the embodiments herein can operate in conjunction with mobile interfaces. Moreover, other types of mobile applications may benefit from the AI-assist features disclosed herein.

Figure 11B:
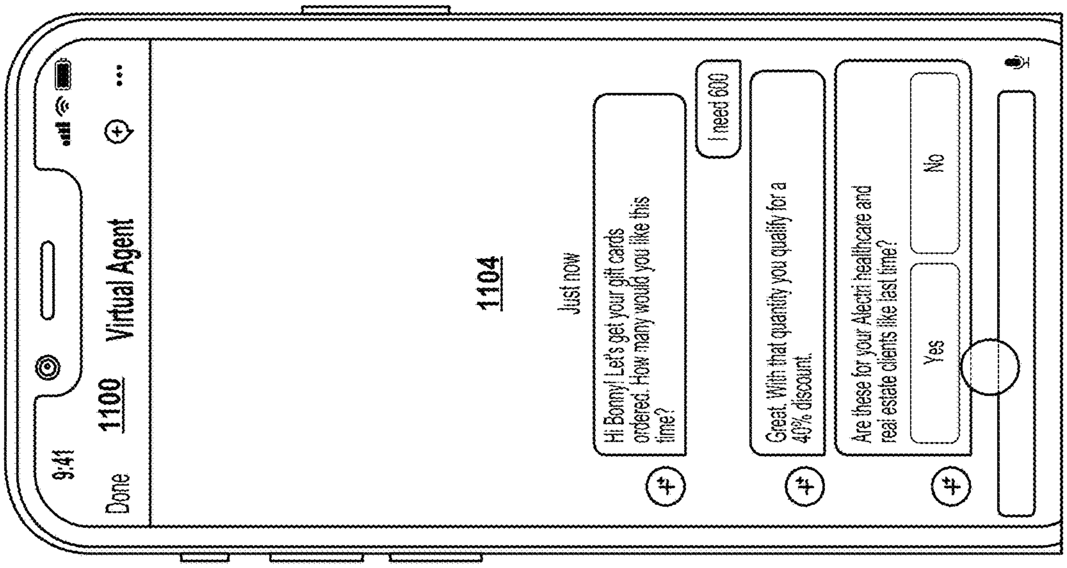
FIGS. 11A, 11B, 11C, 11D, 11E, and 11F depict an LLM integration with a mobile self-service user interface, in accordance with example embodiments.
Figure 11A:
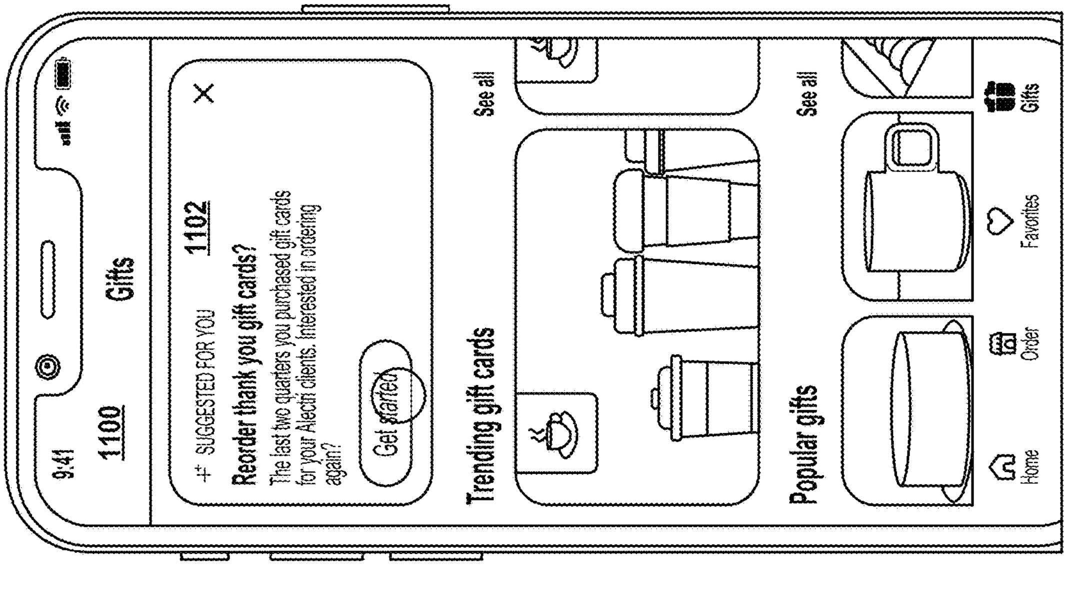

FIG. 11A depicts a self-service mobile interface 1100. As indicated by the AI-assist icon 1102 near the top of the interface, the system (with possible LLM assistance) has determined, based on user history, to suggest that the user order gift cards. FIG. 11B shows a dialog 1104 between the user and an AI-assisted virtual agent in which the user indicates the number of cards they wish to order and the system (with possible LLM assistance) provides the particulars of the order (e.g., the 40% discount) and inquiries as to whether the recipient of the cards will be the same as for previous orders.

Figure 11D:
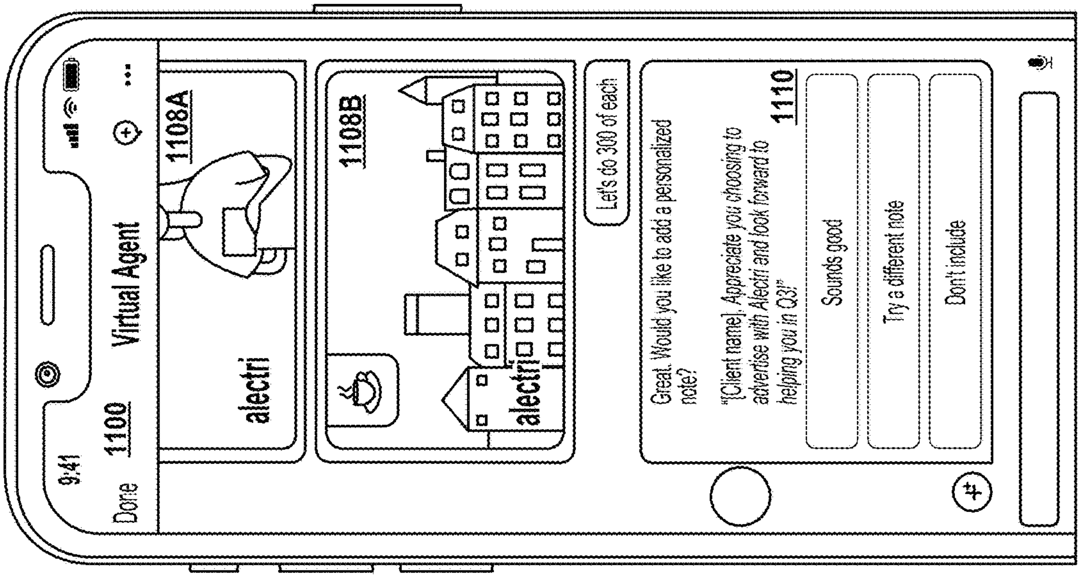
Figure 11C:
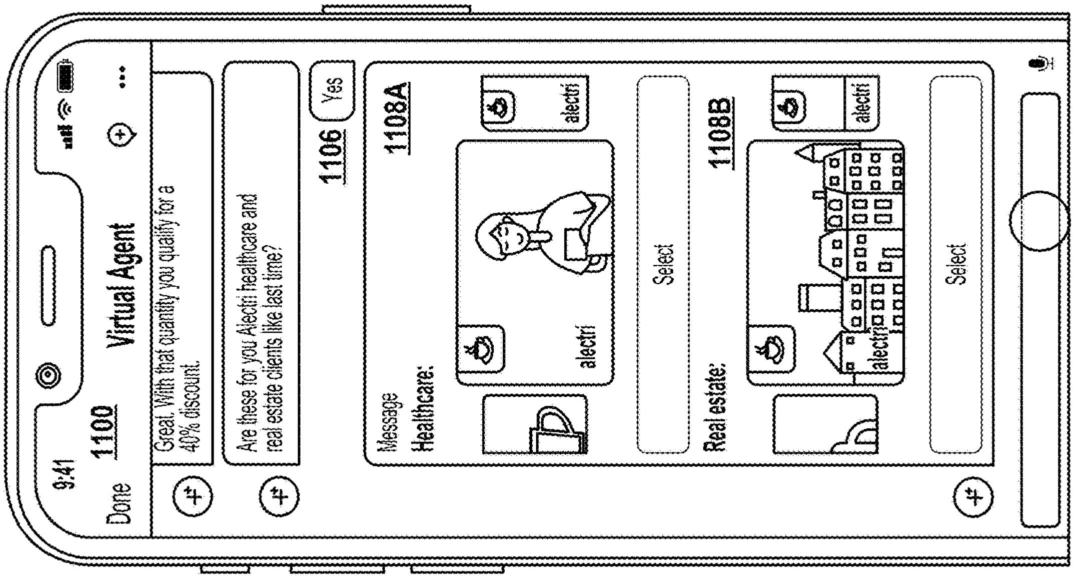
Figure 11F:
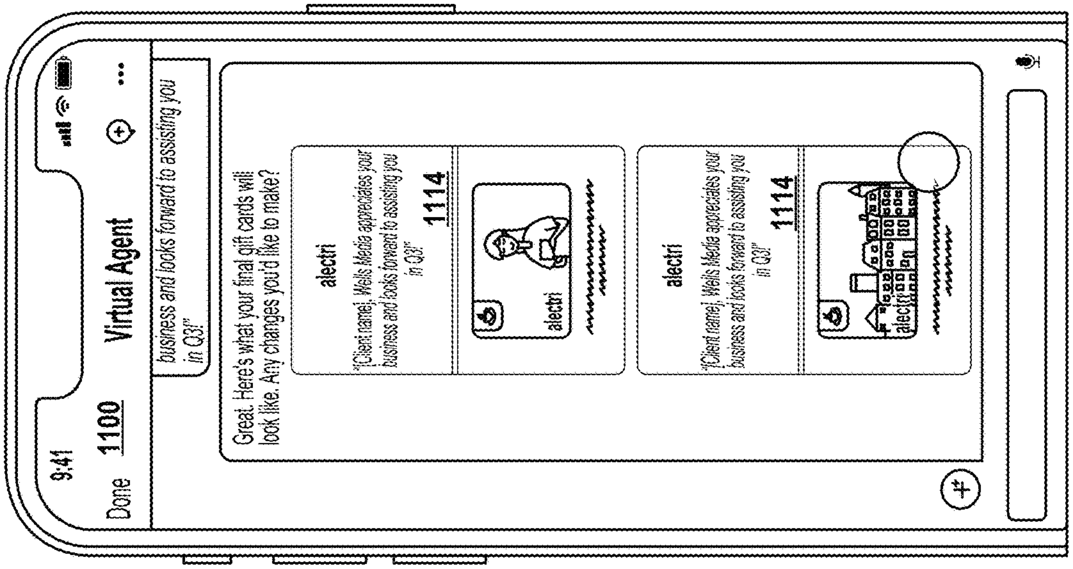
Figure 11E:
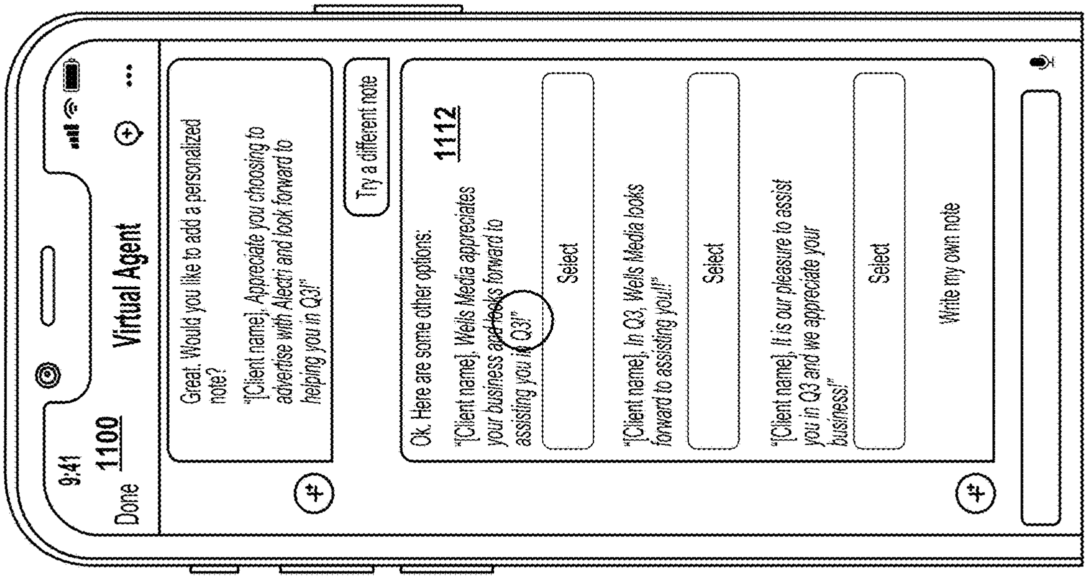

FIG. 11C depicts the self-service mobile interface 1100 after the user has actuated the "Yes" button 1106. The system (with possible LLM assistance) has provided two proposed card designs 1108A and 1108B based on its contextual understanding of the recipients' industries. FIG. 11D depicts the user agreeing to these designs and the system (with possible LLM assistance) suggesting a personalized note 1110 for the cards. FIG. 11E depicts the user asking for a different personalization and the system (with possible LLM assistance) providing several options 1112. FIG. 11F depicts the self-service mobile interface 1100 after the user has selected one of the options. The system (with possible LLM assistance) displays the selected messages 1114 on the cards.

E. Integration with an IT Service Management Application

FIGS. 12A, 12B, 12C, and 12D depict an LLM integration with a service management application. This displayed user interface could be employed to develop, deploy, and upgrade services and software applications, for example.

Figure 12A:
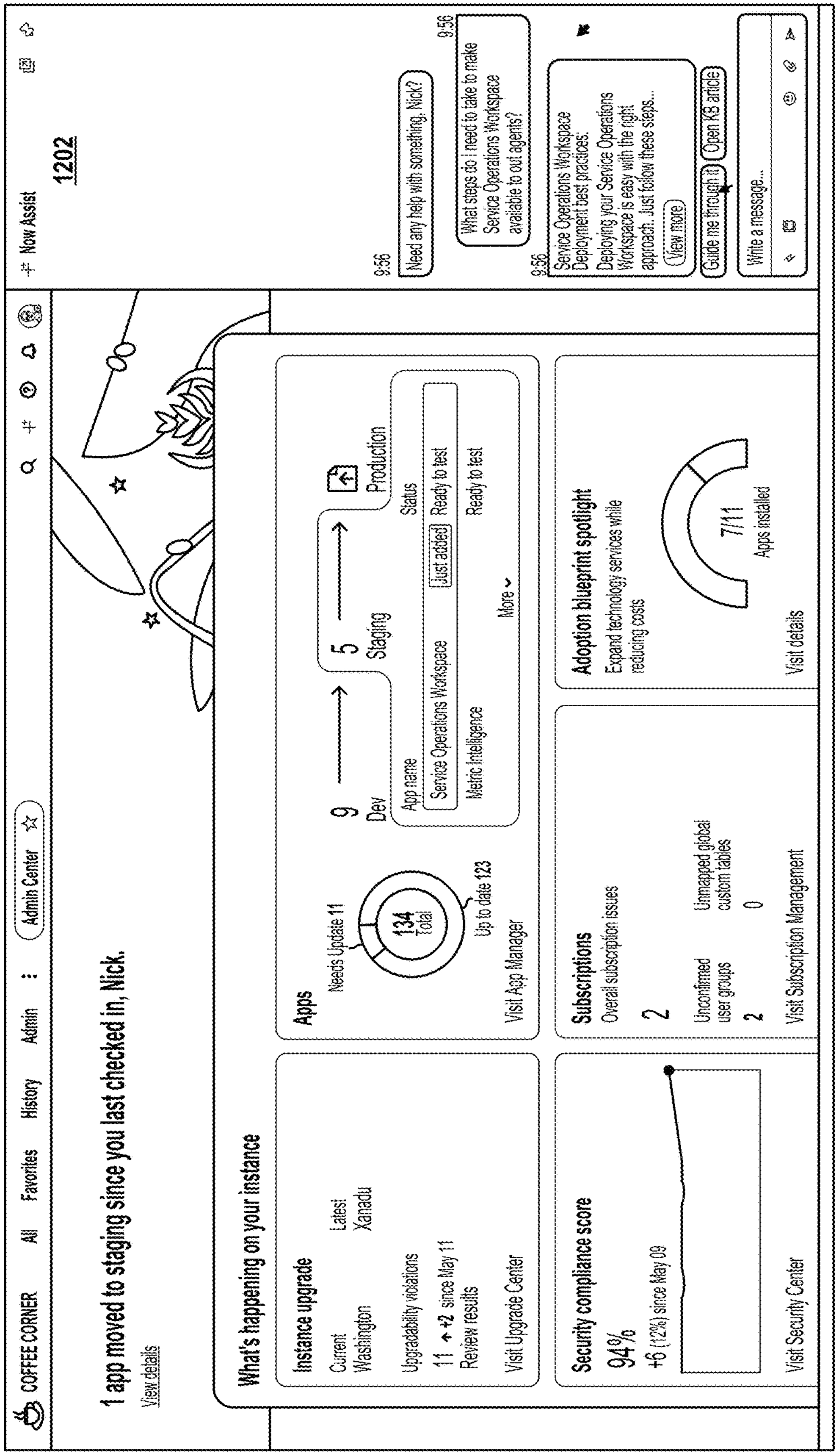
FIGS. 12A, 12B, 12C, and 12D depict an LLM integration with an information technology administration interface, in accordance with example embodiments.
Figure 12B:
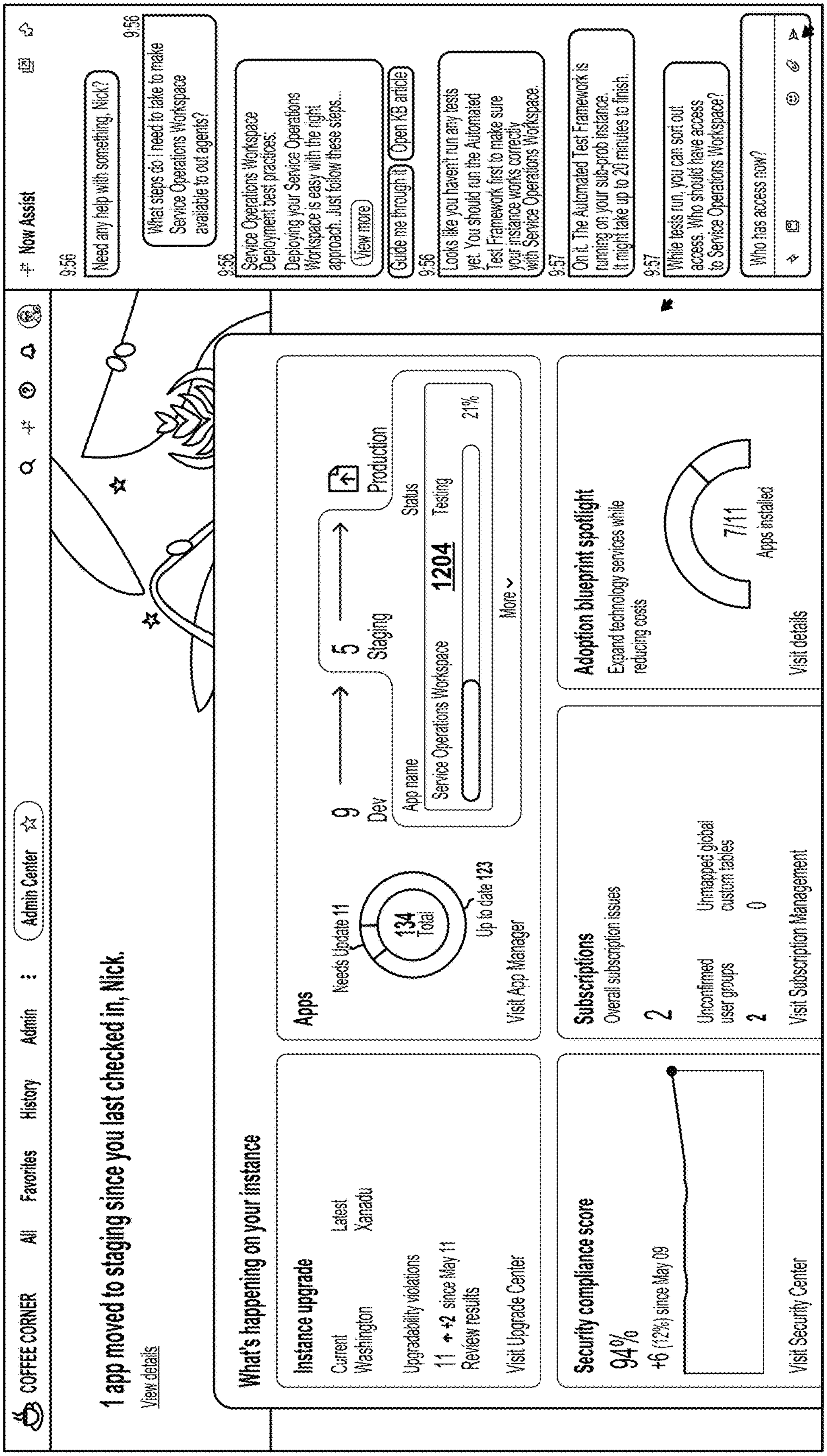

FIG. 12A depicts a graphical user interface 1200 in which a user (e.g., an IT administrator) is asking, by way of a pinned AI-assist interface 1202, for the system to walk them through deploying a service operations workspace. FIG. 12B depicts the system (with possible LLM assistance) taking the user step-by-step through this process, including running automated tests. Notably, the "Apps" panel in the middle of the screen 1204 shows a progress bar for this testing task.

Figure 12C:
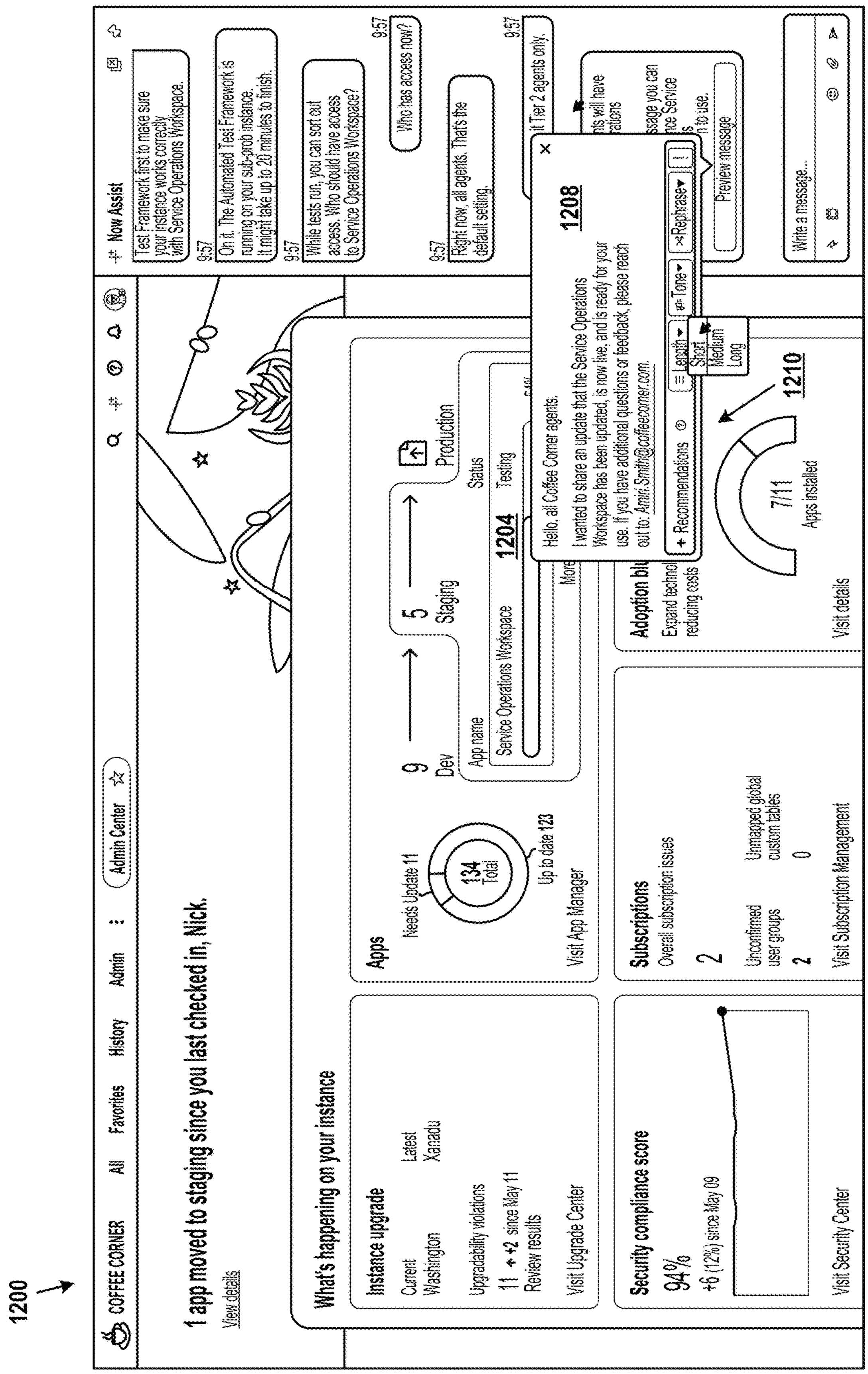
Figure 12D:
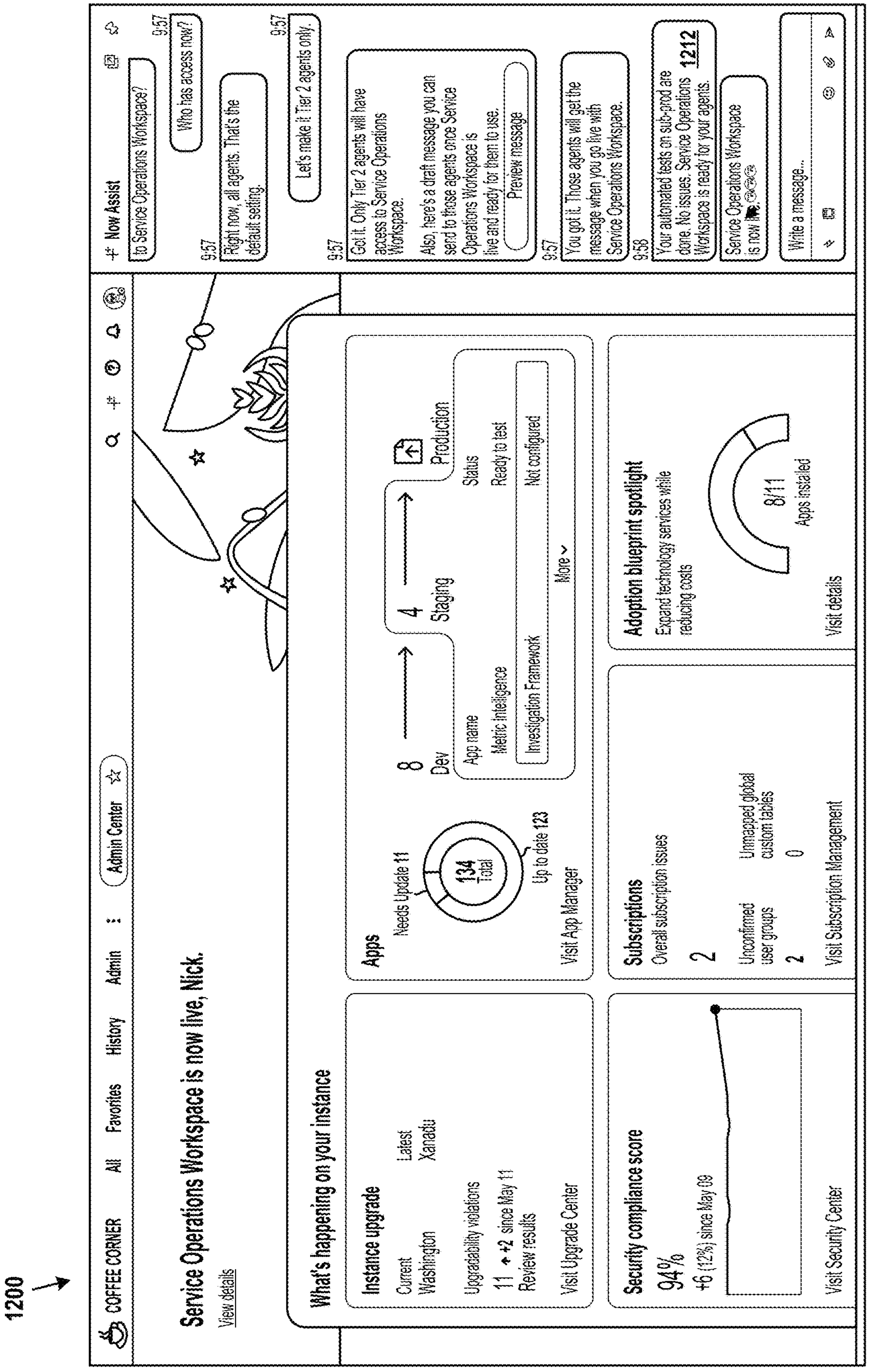

FIG. 12C depicts further dialog between the user and the system while the tests are being run. The system (with possible LLM assistance) answers questions about the upcoming deployment and suggests content for a notification 1208 about the deployment that can be transmitted to users of the service operations workspace. The user is given the option to edit the message by way of the popup window 1210, including use of the AI assist feature to change the length, tone, and phrasing as shown. FIG. 12D depicts the AI assist indicating to the user that the automated testing has concluded was successful in message 1212. The message as edited may be sent to the users of the service operations workspace upon its deployment.

X. Additional Features

In addition to and/or in conjunction with the features above, these embodiments may include various types of AI assistance with person-to-person chat interfaces and content, virtual agent (robot) to person chat interfaces and content, universal AI assistance across multiple applications, application-specific AI assistance, and possibly other features as well. AI assistance can be used to summarize any text, as well as to make suggestions of text that can be added to various items (e.g., incidents and/or knowledgebase articles) or sent to users. Further, developers or non-developers can use AI-assisted text-to-code features to create software modules and application in a low-code/no-code fashion.

XI. Example Operations

Figure 13:
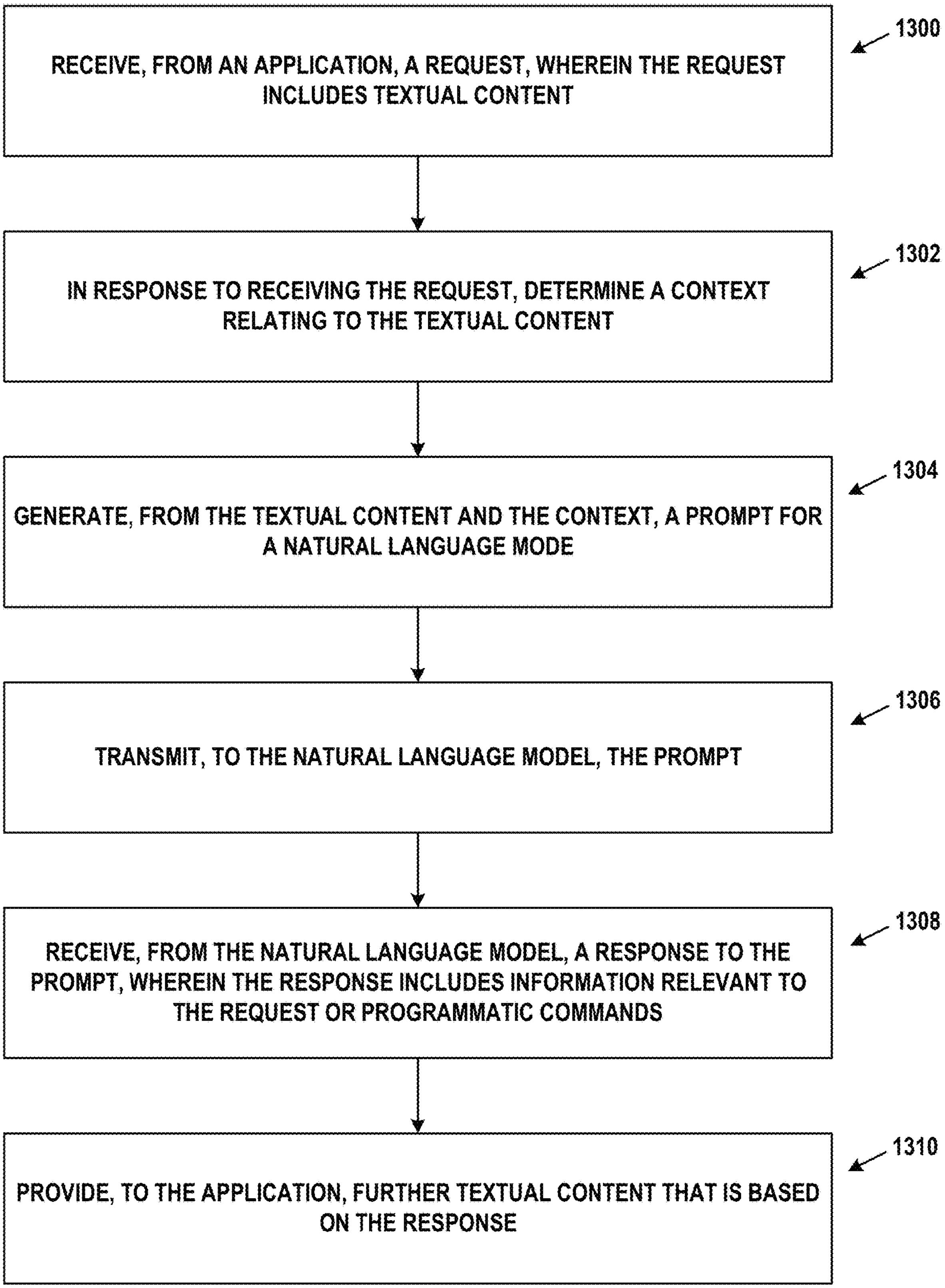
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve receiving, from an application, a request, wherein the request includes textual content.

Block 1302 may involve, in response to receiving the request, determining a context relating to the textual content.

Block 1304 may involve generating, from the textual content and the context, a prompt for a natural language model. The aforementioned features provide a technical solution to a technical problem. Naïve use of a natural language model, such as an LLM, for application enhancement wastes computing resources because users are unable to obtain the enhancements they seek without potentially many tries. These features generate a prompt based on context associated with a request, resulting in a more detailed and accurate input to the natural language model. As a result, the natural language model is more likely to provide the sought after enhancements on the first attempt or at least in fewer attempts. This reduces computing resource wastage.

Block 1306 may involve transmitting, to the natural language model, the prompt.

Block 1308 may involve receiving, from the natural language model, a response to the prompt, wherein the response includes information relevant to the request or programmatic commands.

Block 1310 may involve providing, to the application, further textual content that is based on the response.

In some implementations, receiving the request includes receiving user speech data; and converting the user speech data to the textual content.

In some implementations, the natural language model comprises a large language model. In some implementations, the large language model is transformer-based.

In some implementations, the application is associated with a user interface, and wherein the user interface includes a dialog interface.

In some implementations, the dialog interface can be hidden, pinned, modeless, or docked to other parts of the user interface.

In some implementations, the request and the further textual content is conveyed by way of the dialog interface.

In some implementations, the response includes one or more graphical images, and wherein the one or more graphical images can be moved or copied from the dialog interface to other parts of the user interface.

In some implementations, generating the prompt for the natural language model includes accessing one or more of a database table, an event log, a user profile, a user history, or a service external to a system on which the application is operable.

In some implementations, the prompt for the natural language model is based on information from one or more of the database table, the event log, the user profile, the user history, or the service.

In some implementations, the response includes programmatic commands, the implementations further comprising executing at least some of the programmatic commands on a computing device associated with the application.

In some implementations, the further textual content is also based on results of executing at least some of the programmatic commands on the computing device associated with the application.

In some implementations, the further textual content is relevant to the request.

In some implementations, determining the context relating to the textual content comprises determining the context based on one or more of application information relating to the application or user information relating to a user who made the request.

In some implementations, determining the context relating to the textual content comprises providing at least part of the textual content to a skill mapper application, and wherein the prompt is also generated by a skill identified by the skill mapper application.

In some implementations, the skill is specified in a structured data format including an identifier, description, trigger, and action.

In some implementations, the skill is specified in a structured data format that can be interpreted or executed to provide the response.

In some implementations, the natural language model is a semantic search model that selects the response based on a semantic similarity analysis between the prompt and the response.

XII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

receiving, from an application, a request, wherein the request includes textual content;

in response to receiving the request, determining a context relating to the textual content;

determining, using a skill mapper application, a set of skills corresponding to the request;

generating, based on (i) the textual content, (ii) the set of skills, and (iii) the context, a prompt for a natural language model by modifying at least one canonical prompt;

transmitting, to the natural language model, the prompt;

receiving, from the natural language model, a response to the prompt, wherein the response includes programmatic commands;

invoking a skill of the set of skills based on the response, wherein invoking the skill comprises executing at least some of the programmatic commands on a computing device associated with the application; and providing, to the application, further textual content that is based on the response and a result of invoking the skill.

2. The method of claim 1, wherein receiving the request includes:

receiving user speech data; and converting the user speech data to the textual content.

3. The method of claim 1, wherein the natural language model comprises a large language model.

4. The method of claim 3, wherein the large language model is transformer-based.

5. The method of claim 1, wherein the application is associated with a user interface, and wherein the user interface includes a dialog interface.

6. The method of claim 5, wherein the dialog interface can be hidden, pinned, modeless, or docked to other parts of the user interface.

7. The method of claim 5, wherein the request and the further textual content is conveyed by way of the dialog interface.

8. The method of claim 5, wherein the response includes one or more graphical images, and wherein the one or more graphical images can be moved or copied from the dialog interface to other parts of the user interface.

9. The method of claim 1, wherein generating the prompt for the natural language model includes accessing one or more of a database table, an event log, a user profile, a user history, or a service external to a system on which the application is operable.

10. The method of claim 9, wherein the prompt for the natural language model is based on information from one or more of the database table, the event log, the user profile, the user history, or the service.

11. The method of claim 1, wherein the further textual content is relevant to the request.

12. The method of claim 1, wherein determining the context relating to the textual content comprises determining the context based on one or more of application information relating to the application or user information relating to a user who made the request.

13. The method of claim 1, wherein the skill is specified in a structured data format including an identifier, description, trigger, and action.

14. The method of claim 1, wherein the skill is specified in a structured data format that can be interpreted or executed to invoke the skill.

15. The method of claim 1, wherein the natural language model is a semantic search model that selects the response based on a semantic similarity analysis between the prompt and the response.

16. The method of claim 1, further comprising:

requesting, based on the at least one canonical prompt, additional information corresponding to the request; and receiving the additional information corresponding to the request, wherein generating the prompt for the natural language model is further based on the additional information.

17. A non-transitory computer-readable medium, having stored thereon program instructions that, upon execution by a computing system, cause the computing system to perform operations comprising:

receiving, from an application, a request, wherein the request includes textual content;

in response to receiving the request, determining a context relating to the textual content;

determining, using a skill mapper application, a set of skills corresponding to the request;

generating, based on (i) the textual content, (ii) the set of skills, and (iii) the context, a prompt for a natural language model by modifying at least one canonical prompt;

transmitting, to the natural language model, the prompt;

receiving, from the natural language model, a response to the prompt, wherein the response includes programmatic commands;

invoking a skill of the set of skills based on the response, wherein invoking the skill comprises executing at least some of the programmatic commands on a computing device associated with the application; and providing, to the application, further textual content that is based on the response and a result of invoking the skill.

18. A system comprising:

one or more processors; and memory, containing program instructions that, upon execution by the one or more processors, cause the system to perform operations comprising:

receiving, from an application, a request, wherein the request includes textual content;

in response to receiving the request, determining a context relating to the textual content;

determining, using a skill mapper application, a set of skills corresponding to the request;

generating, based on (i) the textual content, (ii) the set of skills, and (iii) the context, a prompt for a natural language model by modifying at least one canonical prompt;

transmitting, to the natural language model, the prompt;

receiving, from the natural language model, a response to the prompt, wherein the response includes programmatic commands;

invoking a skill of the set of skills based on the response, wherein invoking the skill comprises executing at least some of the programmatic commands on a computing device associated with the application; and providing, to the application, further textual content that is based on the response and a result of invoking the skill.

* * * * *